United States Patent
Hoefken et al.

(10) Patent No.: US 12,188,547 B2
(45) Date of Patent: Jan. 7, 2025

(54) FLEXDRIVE

(71) Applicant: Motus Labs, LLC, Dallas, TX (US)

(72) Inventors: Carlos A. Hoefken, Dallas, TX (US);
Nicolas Olivarez, Denton, TX (US);
Harrison Phillips, Frisco, TX (US);
Caleb Ho, Dallas, TX (US)

(73) Assignee: Motus Labs, LLC, Dallas, TX (US)

( * ) Notice: Subject to any disclaimer, the term of this patent is extended or adjusted under 35 U.S.C. 154(b) by 0 days.

(21) Appl. No.: 18/205,848

(22) Filed: Jun. 5, 2023

(65) Prior Publication Data

US 2023/0392676 A1 Dec. 7, 2023

Related U.S. Application Data

(60) Provisional application No. 63/348,924, filed on Jun. 3, 2022.

(51) Int. Cl.
| | | |
|---|---|---|
| *F16H 49/00* | (2006.01) | |
| *F16H 57/02* | (2012.01) | |
| *F16H 57/021* | (2012.01) | |
| *F16H 57/031* | (2012.01) | |

(52) U.S. Cl.
CPC ......... *F16H 49/001* (2013.01); *F16H 57/021* (2013.01); *F16H 57/031* (2013.01)

(58) Field of Classification Search
CPC .. F16H 49/00; F16H 49/001; F16H 2049/003; F16H 2049/006; F16H 2049/008; F16H 57/021; F16H 57/031; F16D 3/52; F16D 3/72

See application file for complete search history.

(56) References Cited

U.S. PATENT DOCUMENTS

| | | | |
|---|---|---|---|
| 2,899,807 A | | 8/1959 | Schwettman |
| 3,407,902 A | * | 10/1968 | Walton ............... F16N 11/08 |
| | | | 184/6.12 |
| 3,982,408 A | | 9/1976 | Wright |
| 4,096,769 A | | 6/1978 | Horikiri et al. |
| 10,844,944 B2 | | 11/2020 | Bloxham et al. |
| 11,525,502 B2 | * | 12/2022 | Guan .................. F16H 1/32 |
| 2008/0110287 A1 | | 5/2008 | Schonlau |
| 2017/0184190 A1 | | 6/2017 | Klassen |
| 2018/0320771 A1 | | 11/2018 | Thielen |

(Continued)

FOREIGN PATENT DOCUMENTS

| | | |
|---|---|---|
| CN | 111536217 A | 8/2020 |
| CN | 112145650 A | 3/2022 |

(Continued)

*Primary Examiner* — Adam D Rogers
(74) *Attorney, Agent, or Firm* — Jeffrey G. Degenfelder; Carstens, Allen & Gourley, LLP

(57) ABSTRACT

The present disclosure is a flex drive with an input configured to be coupled to a motor or drive. The input can have multiple engagement devices removably coupled to the input. The flex drive can have a drive gear portion that is engaged with the engagement devices. A static gear can be partially engaged by the drive gear based on the engagement devices. A first laminate removably coupled to the drive gear, a flex cup removably coupled to the first laminate, and a second laminate removably coupled to the flex cup can allow for the flexibility desired for a flexgear. An output can be removably coupled to the second laminate.

19 Claims, 23 Drawing Sheets

(56) References Cited

U.S. PATENT DOCUMENTS

| | | |
|---|---|---|
| 2020/0208720 A1 | 7/2020 | Hoefken |
| 2020/0278016 A1 | 9/2020 | Hofmann et al. |
| 2023/0392678 A1 | 6/2023 | Hoefken |

FOREIGN PATENT DOCUMENTS

| | | | | |
|---|---|---|---|---|
| CN | 114110095 A | * | 3/2022 | ............ F16C 19/166 |
| DE | 102020104758 A1 | * | 8/2020 | ............. F16C 33/66 |
| GB | 2129907 A | | 5/1984 | |

* cited by examiner

FLEXDRIVE

CROSS-REFERENCE TO RELATED APPLICATIONS

This application claims benefit of U.S. Provisional Application No. 63/348,924, filed on Jun. 3, 2022, entitled "Flexdrive," the disclosure of which is hereby incorporated by reference in its entirety.

BACKGROUND

Technical Field

The present disclosure relates to flexible drives or gears. More particularly, and not by way of limitation, the present disclosure is directed to an apparatus, system, or method for a flexible gear having no flexible cup or flexible gear element.

Description of Related Art

Flex drives or gears will typically have a flexible cup or gear element. However, this creates a problem in that conventional flexible cups or gear elements can be difficult to replace and cannot be adjusted. It would be advantageous to have a system and method for apparatus, system or method for a flexible gear having no flexible cup or flexible gear element that overcomes the disadvantages of the prior art. The present disclosure provides such a system and method.

BRIEF SUMMARY

The present disclosure is a flex drive with an input configured to be coupled to a motor or drive. The input can have multiple engagement devices removably coupled to the input. The flex drive can have a drive gear portion that is engaged with the engagement devices. A static gear can be partially engaged by the drive gear based on the engagement devices. A first laminate removably coupled to the drive gear, a flex cup removably coupled to the first laminate, and a second laminate removably coupled to the flex cup can allow for the flexibility desired in a flexgear. An output can be removably coupled to the second laminate.

Other aspects, embodiments and features of the present disclosure will become apparent from the following detailed description when considered in conjunction with the accompanying figures. In the figures, each identical, or substantially similar component that is illustrated in various figures is represented by a single numeral or notation. For purposes of clarity, not every component is labeled in every figure. Nor is every component of the disclosure shown where illustration is not necessary to allow those of ordinary skill in the art to understand the disclosure.

BRIEF DESCRIPTION OF THE DRAWINGS

The novel features believed characteristic of the disclosure are set forth in the appended claims. The disclosure itself, however, as well as a preferred mode of use, further objectives, and advantages thereof, will be best understood by reference to the following detailed description of illustrative embodiments when read in conjunction with the accompanying drawings, wherein:

DETAILED DESCRIPTION

Figure 1:
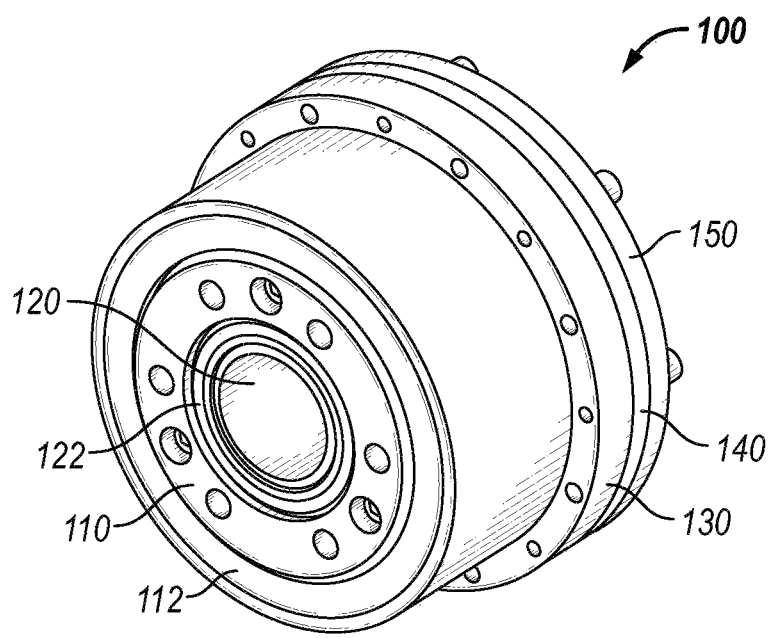
FIG. 1 is a perspective view of the Output side of one embodiment of the disclosure.

Embodiments of the disclosure will now be described. FIG. 1 is a perspective view of a flexdrive 100 from an output side 111. For clarity, from an output side 111 means a view of the flexdrive 100 from the side or end of the flexdrive 100 that an output device can be coupled to the output 110 can be coupled. The flexdrive 100 can have an output 110 that is concentrically arranged around an input shaft 120 and/or an input bearing 122. It would be understood that bearing could also mean rollers, or sets of bearings, ball bearings, and/or rollers. In at least one example, the output 110 can have a seal 112 and a main body 130 concentrically arranged around output 110. In at least one embodiment, the main body 130 can be coupled to a ring gear 140, which may be coupled to a lid 150.

The flexdrive 100 is a set of concentric components. A subset of those components could be considered stationary or a ground set. A second subset rotates at high speed and low torques or an input set. A third subset rotates at low speed and high torques, or output set. The ground set, in at least one example, can comprise the main body 130, ring gear 140, and/or lid 150. The ground set may also include other machine elements that ease movement and/or rotation such as bearings, seals, and fasteners. This allows the Ground Set to remain stationary as the other sets rotate in a concentric fashion about the Ground set. In at least one example, the Ground Set can be bolted to other stationary elements like plates or proper structures of different shapes. In some examples, the Ground set may include ports for grease, oil or similar, and/or may include access ports to adjust for backlash.

Figure 2:
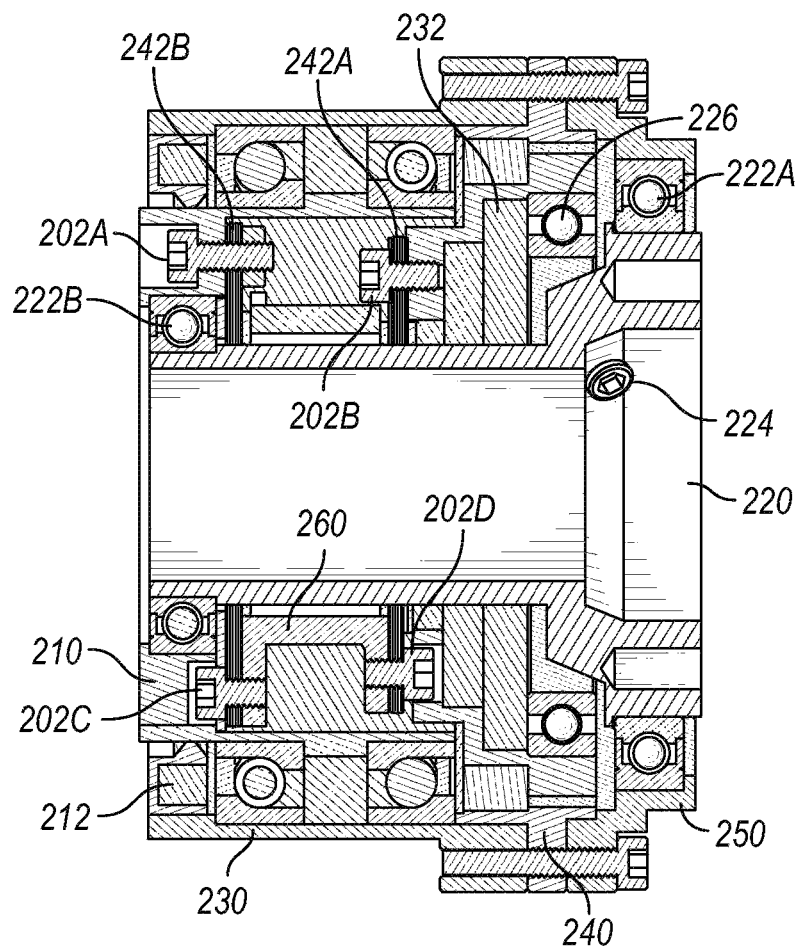
FIG. 2 is a sectional view of a flexdrive.

FIG. 2 is a sectional view of a flexdrive 200. When viewed from the top and bottom of the sectional view (equivalent to a side view) of the flexdrive 200, the outer portions of the flexdrive 200 are the main body 230, the ring gear 240, and lid 250 that can surround an input shaft 220. In at least one embodiment, the main body 210, the ring gear 240, and lid 250 are coupled together by a fastener(s) 202A/202B/202C/202D (collectively fasteners 202). In at least one example, a fastener may have a helical pattern surrounding a central shaft, similar to a bolt or screw. These fastener(s) 202 can be utilized to couple portions of the flexdrive 200 together in a secure and removable manner.

The input shaft 220 can interface the input bearings 222A/222B (collectively input bearing(s) 222) that allow the input shaft 220 to rotate freely in relation to other portions of the flexdrive 200. For example, the input bearing 222A can be placed between the input shaft 220 and the lid 250. This allows the input shaft 220 to rotate in relation to the lid 250 with ease. Similarly, input bearing 222B can be placed between the input shaft 220 and the output 210. This allows for movement flexibility of the output 210 and the input shaft 220. A set screw 224 can interface with the input shaft 220 that allows for an engagement of the input shaft 220 with a cup gear bearing 226. In at least one example, the cup gear bearing 226 may interact with a cup gear 232. For example, as the input shaft 220 is rotated, the set screw 224 (or other adjustable engagement device) engages with the cup gear bearing 226 which pushes or engages with the cup gear 232. The cup gear 232 can then engage with the ring gear 240.

The ring gear 240 can be coupled to the lid 250 and the main body 230 through fastener(s) 202. The ring gear 240 can be stationary in relation to the lid 250 and the main body 230. The ring gear 240 may include one or more sets of gear teeth. A set can include one or more of an element. The cup gear 232 can include one or more sets of gear teeth that may engage with the one or more sets of gear teeth of the ring gear 240. In at least one example, the cup gear 232 can be coupled to a first flexible laminate 242A, and a second flexible laminate 242B (collectively, flexible laminates 242) can be coupled to the output 210. In at least one embodiment, the flexible laminates 242A/242B can allow for the input shaft 220 to impart a movement on the output 210 via the ring gear 240 and/or the cup gear 232. In at least one example, the flexible laminates 242A/242B are coupled together through a solid coupler 260. The solid coupler 260 does not flex but does allow for the transfer of rotational energy and/or power.

In at least one example, the output may have a seal 212 that prevents materials from entering the area around and/or surrounding bearings 222, the input shaft 220, flexible laminates 242, and/or the solid coupler 260. Because of the tolerances for the flexdrive 200, any material, including but not limited to, sand, dirt, oils, fibers, and/or other materials that can create friction between two parts, can cause significant damage or failure of the flexdrive 200.

The output set can comprise the output, output flexible laminations, solid coupler, cup gear flexible laminations, and a cup gear. In at least one embodiment, the output set may comprise other machine elements, such as, but not limited to, bearings and fasteners. It would be understood that the output set is a concentric assembly at its normal state but can bend per the flexible laminations. In at least one example, the output set can be mounted concentrically to the ground set by one, two, or more bearing elements. The output can only rotate on its axis concentric to the ground set axis. The combination of the output flexible laminations, solid coupling, cup gear flexible laminations, and/or cup gear are assembled in a series or daisy chain fashion. because of the flexible laminations, the cup gear can be forced off-center with a relatively small force compared to the forces transmitting torque. In at least one embodiment, the output set can be designed to allow for high torsional stiffness and relatively low bending stiffness.

In at least one example, an input device coupled to the flexdrive 200 can cause the input shaft 220 to impart a motion on the cup gear 232. The motion may be a sinusoidal motion or manner of motion as the gear does not traverse along ring gear 240 in a linear or consecutive manner, there are skips and jumps based on the flexible nature of the gear. The flexing of the flexible laminations 242A/242B causes the cup gear 232 to move in a jumping or sinusoidal manner, where the cup gear 232 engages the ring gear 240 at one point, dis-engages, and then reengages at another point a design specified distance from the first point.

Figure 3:
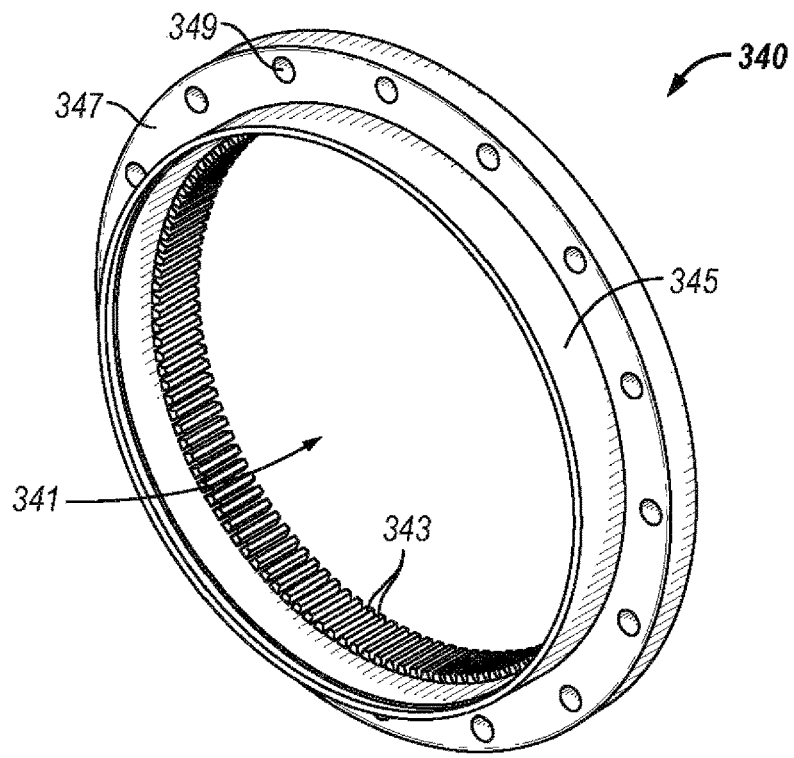
FIG. 3 is a perspective view of the ring gear.

FIG. 3 is a perspective view of the ring gear 340. The ring gear 340 in at least one embodiment is circular having a defined opening 341. On an internal surface of the defined opening 341, there can be a set of gear teeth 343. A locating surface 345 can be adjacent to the set of gear teeth 343 on the outer surface of the defined opening 341. In at least one example, the locating surface 345 may be adjacent to a mounting surface 347. The mounting surface 347 may include a plurality (meaning two or more) mounting holes 349.

Figure 4:
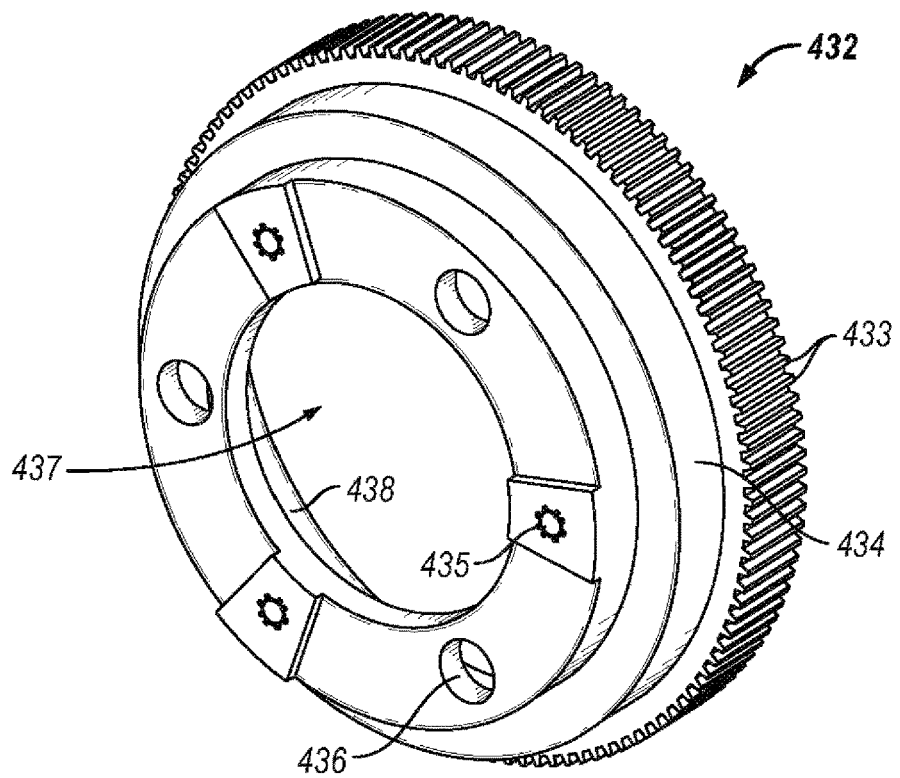
FIG. 4 is a perspective view of the cup gear.

FIG. 4 is a perspective view of the cup gear 432. The cup gear 432 is generally circular and in at least one example can have a tiered structure in a direction perpendicular to the diameter of the cup gear 432. The tiers may include a gear tier, having a set of gear teeth 433, and a tier below may include an engagement tier and a mounting tier 434. In at least one embodiment, the mounting tier 434 can include a plurality of mounting holes 435, and a plurality of access holes 436. The tiers may surround a defined opening 437 that may have the set of gear teeth 433 on its outer circumference and a bearing surface 438 on the inner surface.

Figure 5:
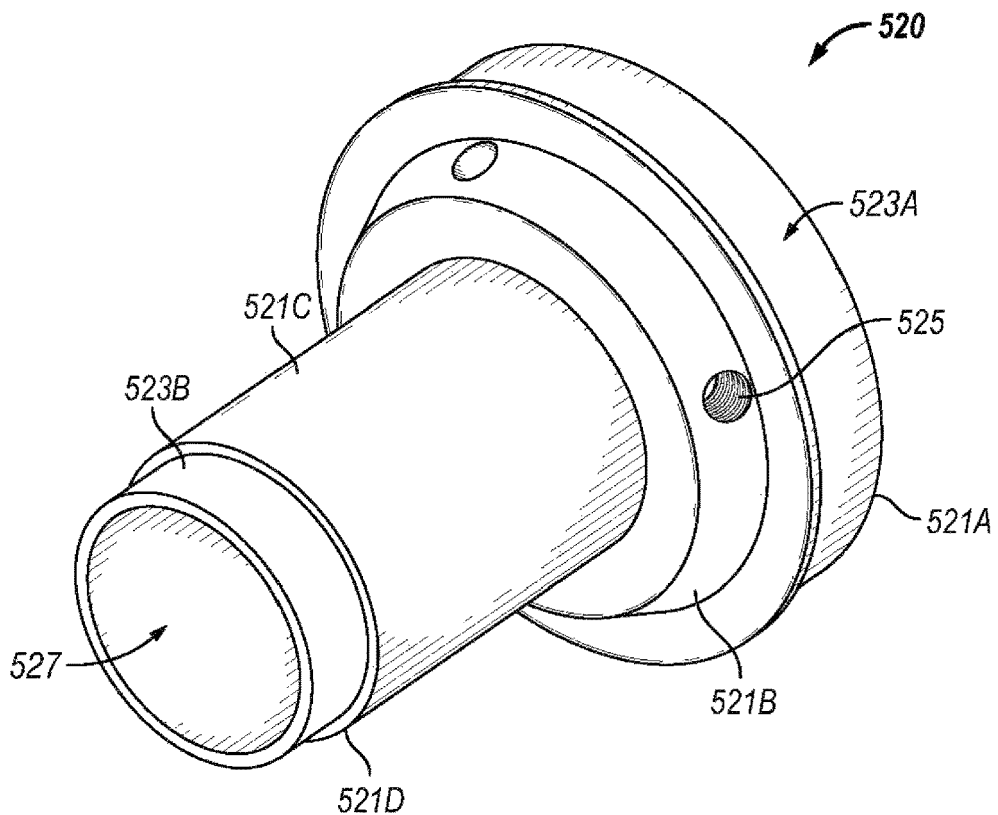
FIG. 5 is a perspective view of the input shaft.

FIG. 5 is a perspective view of the input shaft 520. The input shaft 520 can have multiple sections: a section 521A containing a first bearing surface 523A, an engagement section 521B, a shaft section 521C, and a section 521D having second bearing surface 523B. The first section 521A, containing a first bearing surface 523A, can interface and/or engage with a bearing (not illustrated) to allow for freedom of rotation for the input shaft 520. The engagement section 521B can include one or more apertures or holes 525 that allow for an adjustable engagement device to engage with a bearing or other surface. In at least one embodiment, the adjustable engagement device is a set screw, and the one or more apertures or holes 525 are tapped to allow for screw, bolt, or other interconnection patterns to be utilized. An interconnection pattern allows for the connection of two elements in a manner that allows for removability or adjustment at a later time. The shaft section 521C allows for a solid surface where additional portions of a flex drive can rotate about a central axis or in a coaxial manner. In at least one example, additional bearings or other rotational elements may touch or otherwise interact with the shaft section 521C. The shaft section 521C may also define a hollow portion 527 of the input shaft 520. In at least one example, the hollow portion 527 may extend the entire length of the input shaft 520. Alternatively, if more weight is desired the hollow portion 527 may extend partially along the length of the input shaft 520. The second section 521D, containing a second bearing surface, 523B can interface and/or engage with a bearing (not illustrated) to allow for freedom of rotation for the input shaft 520.

Figure 6:
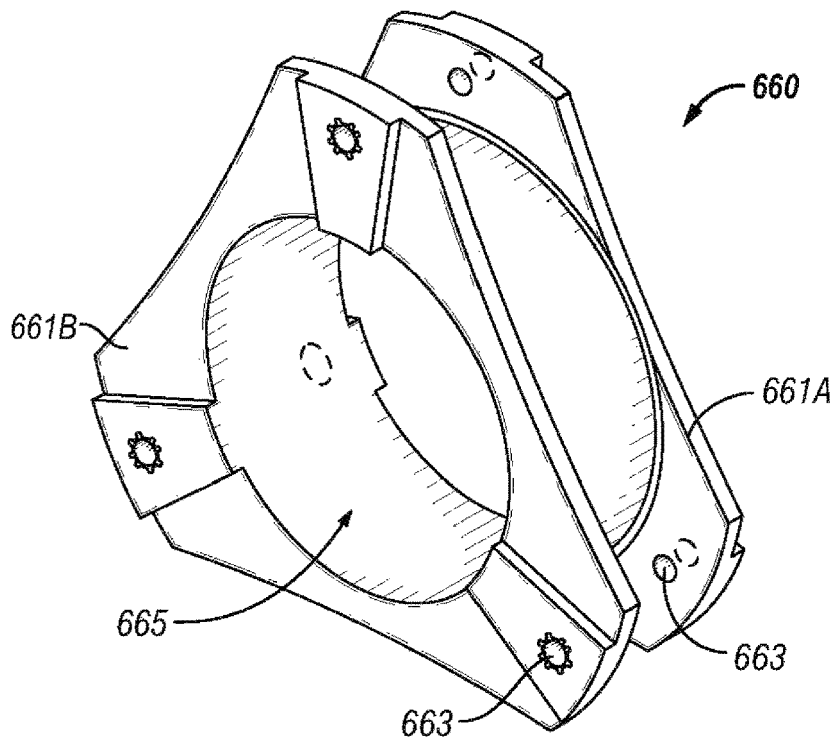
FIG. 6 is a perspective view of the solid coupler.

FIG. 6 is a perspective view of the solid coupler 660. The solid coupler 660 can include a first mounting surface 661A and a second mounting surface 661B (collectively mounting surfaces 661). The mounting surfaces 661 can have at least one mounting aperture or hole 663 on each surface. A central section between the two mounting surfaces 661 can define a hollow shaft 665. In at least one example, a wall defining the central section and/or hollow shaft 665 may be perpendicular to the direction of the mounting surfaces 661.

Figure 7:
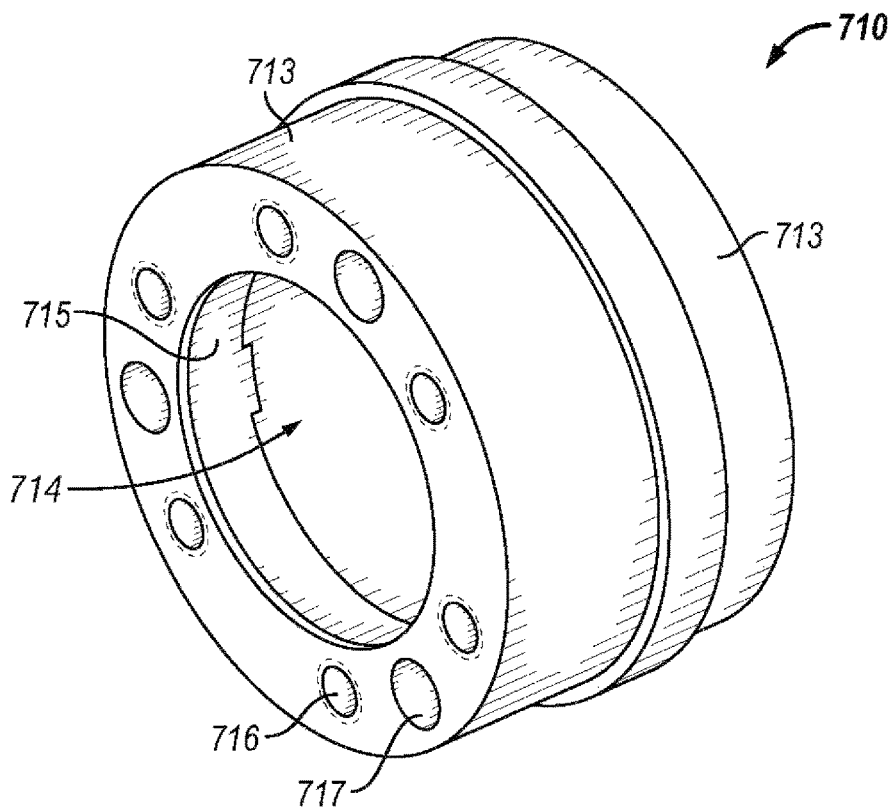
FIG. 7 is a perspective view of the output.

FIG. 7 is a perspective view of the output 710. The output 710 is generally cylindrical in shape having a central aperture 714 that allows for an input bearing to be engaged at an input bearing surface 715. The walls that surround and/or define the central aperture 714 may have additional holes or apertures, such as but not limited to, threaded apertures 716 and mounting apertures 717. In at least one example, the threaded apertures 716 will allow for the engagement and/or coupling of the output 710 to other devices, while the mounting apertures allow for engagement or coupling to a flexible lamination (not illustrated). In at least one embodiment, the threaded apertures 716 and the mounting apertures 717 may include at least a portion of the internal voids a set of threads or threading along the internal circumferences of the apertures to allow for the coupling with bolts, screws, and/or other fastening mechanisms or devices. The outer circumferential surfaces of the cylindrical body of the output 710 may include bearing surfaces 713 that allow for engagement with additional bearings or other rotational freedom devices.

Figure 8:
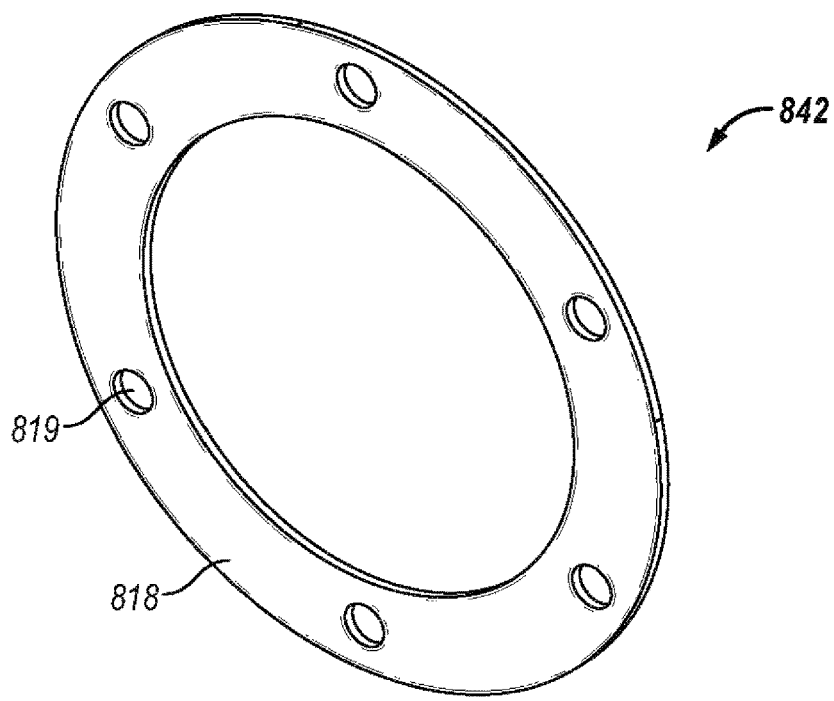
FIG. 8 is a perspective view of the flexible lamination.

FIG. 8 is a perspective view of the output flexible lamination 842. The flexible lamination 842 can be manufactured from spring or flexible material 818 that allows for deformation of the flexible lamination 842 by up to 90 degrees without breakage. The degrees that the flexible lamination 842 can flex can be used to calculate the flexibility coefficient of the flexible laminations, and/or flexdrive. The spring or flexible material 818 may include carbon fiber, plastics, metals, alloys, and/or other similar materials or combinations thereof. The flexible laminations 842 can include at least one hole or aperture 819 that allows for bolts, screws, or other fastening devices or mechanism to pass through.

Figure 9:
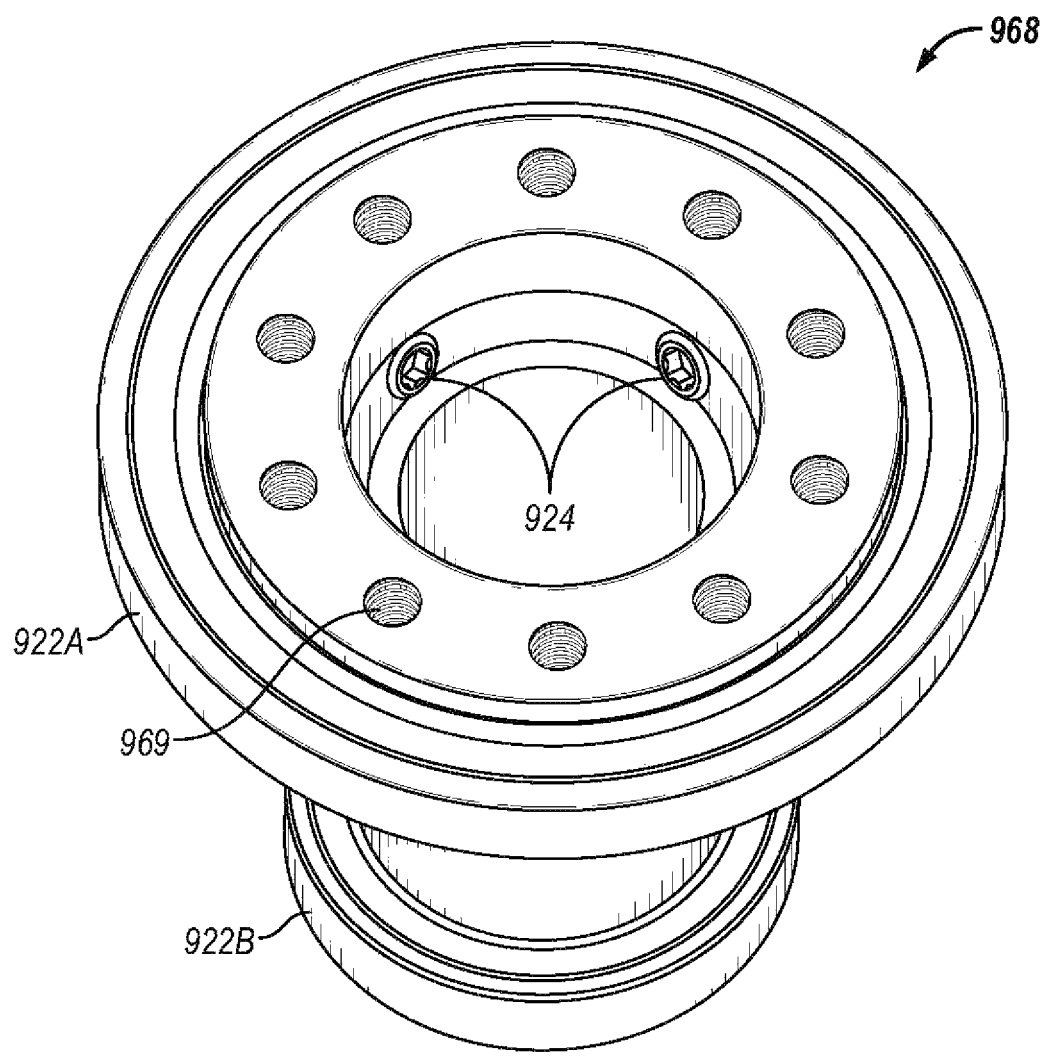
FIG. 9 is a perspective view of the input side of the input shaft showing the set screws.

FIG. 9 is a top view of the input side of the input shaft showing the set screws that form an input assembly 968. The input 920 can have multiple sections that allow for at least one mounting aperture 969 to be present to allow the input 920 to be coupled to other devices, mechanisms, or systems, for adjustable mechanisms 924 to be utilized to adjust how tight and/or aggressive the force the input 920 applies to other portions of a flexgear, and a hollow shaft that can allow for a central aperture (not illustrated) to pass through the input 920. The section of the input 920 that includes the at least one mounting aperture 969 may include an outer bearing surface (not illustrated) that can engage with bearings or roller(s) 922A. Similarly, the hollow shaft (not illustrated) can have an outer circumferential surface that can interface with a bearing or roller 922B.

Figure 10:
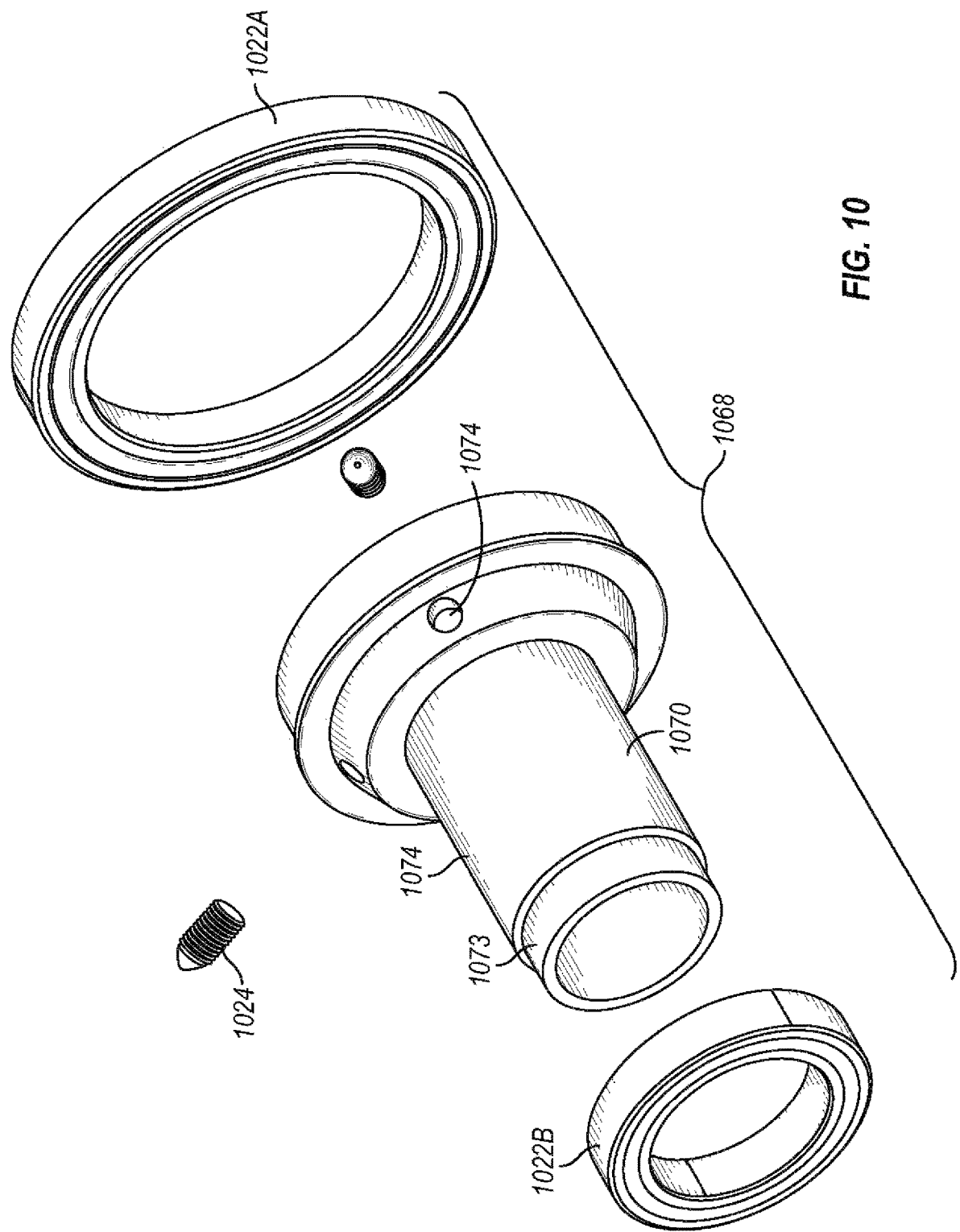
FIG. 10 is a perspective explosion view of the input shaft, bearings, and set screws.

FIG. 10 is a perspective explosion view of the input shaft, bearings, and set screws that form an input assembly 1068. The input 1020 can have multiple sections that allow for the input 1020 to be coupled to other devices, mechanisms, or systems that can be utilized to adjust how tight and/or aggressive the force the input 1020 applies to other portions of a flexgear, and an input or hollow shaft 1070 that can allow for a central aperture (not illustrated) to pass through the input 1020. The section of the input 1020 utilized for mounting may include an outer bearing surface (not illustrated) that can engage with bearings or roller(s) 1022A. Similarly, the hollow shaft 1070 can have an outer circumferential surface or a bearing surface 1073, that may also be recessed from the input shaft 1070, that can interface with a bearing or roller 1022B. The set screws 1024 may pass through at least one adjustment aperture 1074. In at least one embodiment, the at least one adjustment aperture 1074 may be tapered to allow for adjustment. In some examples, where there are additional pieces forming the adjustment mechanism the at least one adjustment aperture 1074 may be a smooth bore.

The input set, in at least one example, can comprise the Input, and Adjustable mechanisms. In some examples, the input set may include machine elements such as but not limited to Bearings, Seals, and/or fasteners that can aid in rotation and/or securing.

The Input Set can be concentrically assembled with the Ground Set and/or the Output Set (depending on the embodiment). For example, the Input Set can rotate concentrically to the Ground Set. The Input Set includes adjustable mechanisms that are designed to force the cup gear to contact/mesh the ring gear on the Ground Set. Each adjustable element could be a Set Screw (like in this embodiment) or any other that will give the same results. As the Input rotates, the adjustable elements will keep forcing the cup gear to mesh with the ring gear producing a wobbling motion typical of hypocycloidal gears. The Flexible Laminations allow for the torque generated by the wobbling motion to be transmitted to the Output and the relatively small bending forces to stay in the system as potential energy or converted into small amounts of heat that will be dissipated.

Figure 11:
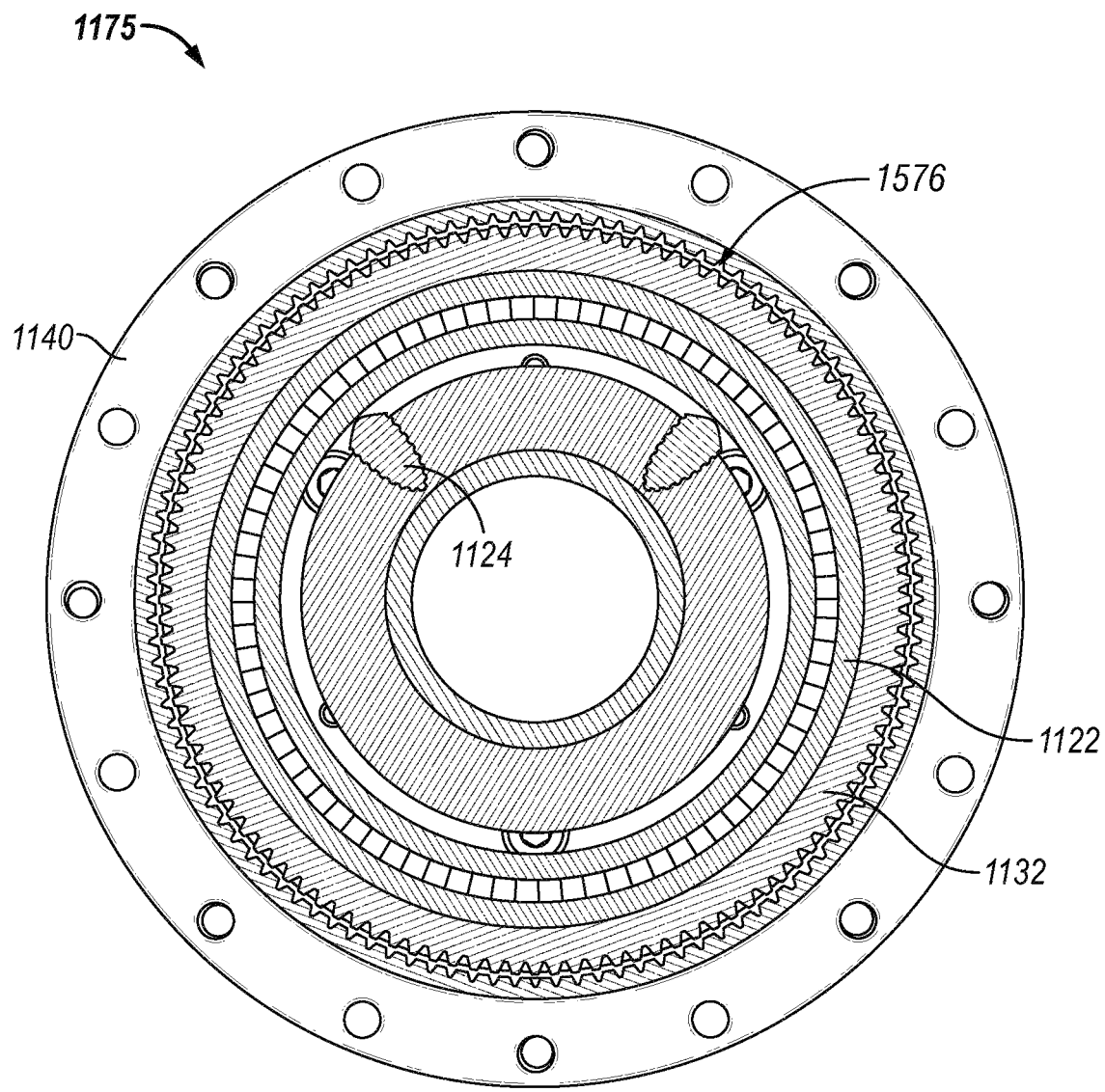
FIG. 11 is a section view showing the cup gear concentric with the ring gear.

FIG. 11 is a section view showing the cup gear 1132 concentric with the ring gear 1140 forming a wave generator section 1175. The cup gear 1132 can be concentric with the ring gear 1140 by means of having a ratio that is Ratio=Cup Gear #teeth/(Ring Gear #teeth−Cup Gear #teeth). Put another way the ratio is the number of cup gear teeth, divided or over the number of ring gear teeth minus the cup gear teeth. This offset nature of the ratio of gear teeth between the two gears allows for the flexgear effect. This effect allows for a high-speed low torque input to become a low-speed high torque output or vice versa. As the set screws 1124 are adjusted, e.g., pushing against the bearing 1122, it causes the cup gear 1132 to engage with the ring gear 1140. In this figure there is a relaxed position with the teeth not engaged 1176. In at least one embodiment, the engagement can be a zero or low backlash engagement that allows for smooth operation.

Figure 12:
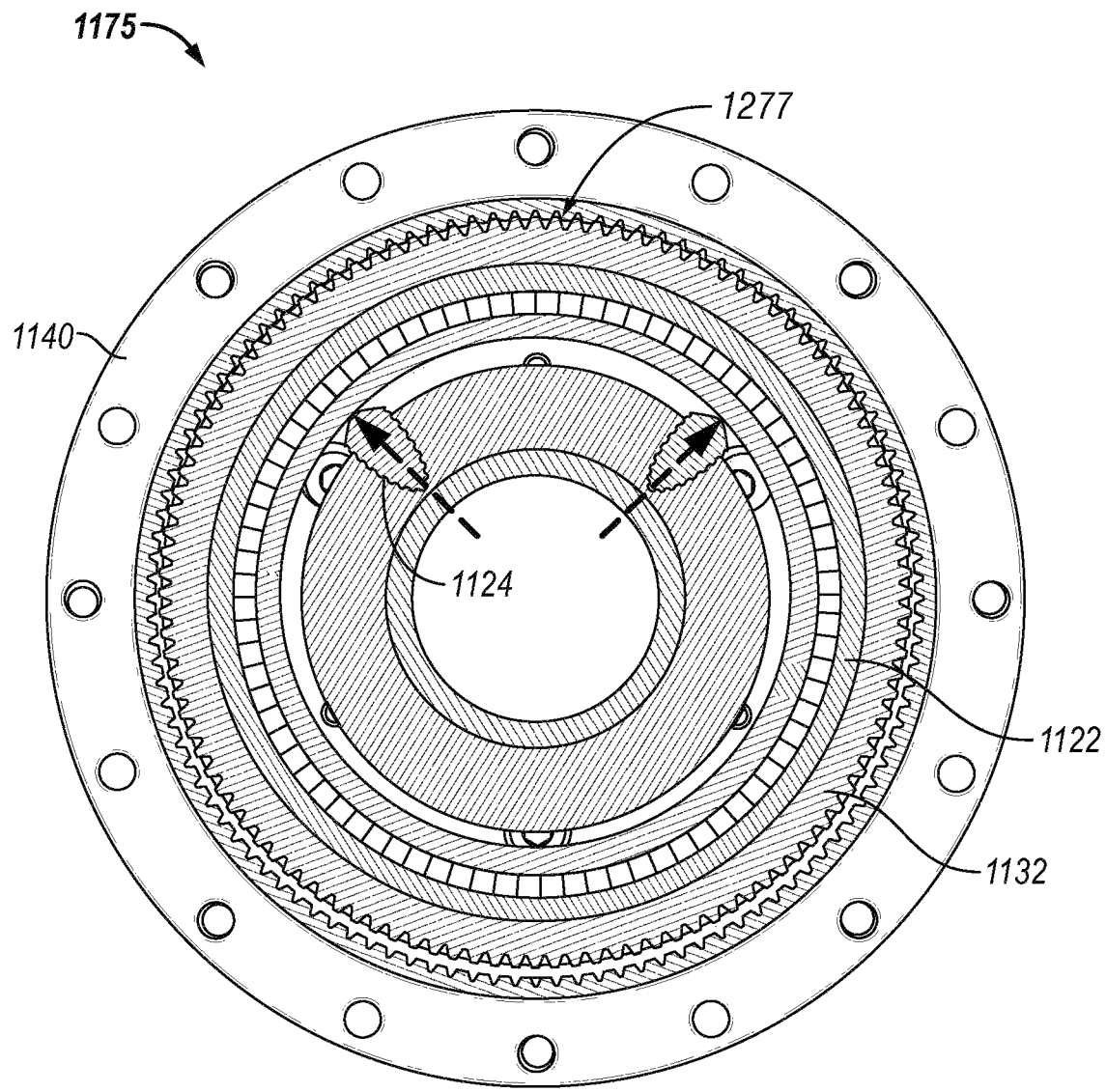
FIG. 12 is a section view showing the cup gear eccentric and meshing with the ring gear by means of the Set Screw pushing the cup gear off-center.

FIG. 12 is a section view showing the cup gear 1232 concentric and meshing with the ring gear 1240 forming a wave generator section 1275 by means of the set screw 1224 pushing the cup gear 1232 off-center. The cup gear 1232 can be concentric with the ring gear 1240, by means of having a ratio that is: Ratio=Cup Gear #teeth/(Ring Gear #teeth−Cup Gear #teeth). Put another way the ratio is the number of cup gear teeth, divided or over the number of ring gear teeth minus the cup gear teeth. This offset nature of the ratio of gear teeth between the two gears allows for the flexgear effect. This effect allows for a high-speed low torque input to become a low-speed high torque output or vice versa. As the set screws 1224 are adjusted, e.g., pushing against the bearing 1222, it causes the cup gear 1232 to engage with the ring gear 1240. In this figure there is a relaxed position with the teeth engaged 1277. In at least one embodiment, the engagement can be a zero or low backlash engagement that allows for smooth operation.

Figure 13A:
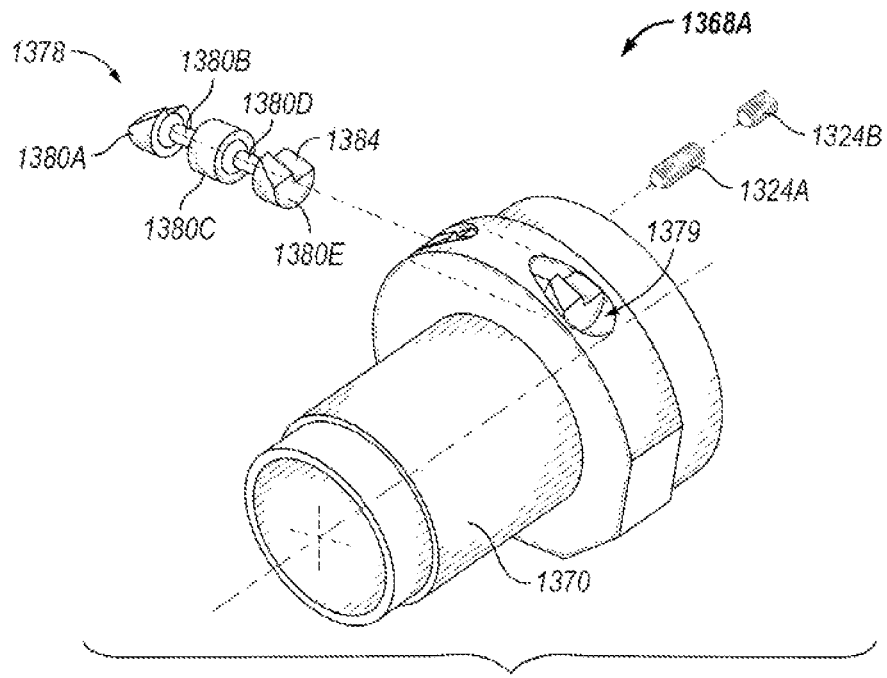
FIG. 13A is a perspective view illustration of an input assembly.

FIG. 13A is a perspective view illustration of an input assembly 1368A. The input assembly 1368A can provide for an adjustable mechanism 1324 to engage with an adjustment button 1378. The adjustment button 1378 can engage and/or interact with a bearing, roller, set of bearings, cup gear, and/or other devices (not illustrated) that engages or interacts with a ring gear (not illustrated) to cause a rotational movement.

The adjustment button 1378, in at least one example, may resemble a bar bell, having a first pivot end 1380A, and a second pivot end 1380E. These pivot ends 1380A/1380B can be coupled to a central engagement point 1380C that allows for an adjustable mechanism 1324 to cause the positioning of the adjustment button 1378. The pivot ends 1380A/1380E and the central engagement point 1380C may be coupled together through a first coupling section 1380B, and/or a second coupling section 1380D. In at least one example, the coupling sections 1380B/1380D may be removably coupled to one or both of the pivot ends 1380A/1380E and/or the central engagement point 1380C. In some examples, the first pivot end 1380A and the first coupling section 1380B, and/or the second pivot end 1380E and section coupling section 1380D, may be formed, manufactured, and/or permanently coupled together and allow for a removable coupling to the central engagement point 1380C. The adjustment button 1378 may be placed within a button aperture 1379 that passes through the input shaft 1370. In at least one embodiment, the adjustment button 1378 can utilize the pivot ends 1380A/1380E to adjust the engagement or interaction with other devices. For example, the pivot ends 1380A/1380E may have a variable radius along their circumferential surface, which as the central engagement point is adjusted, the pivot ends 1380A/1380E can be rotated to increase and/or decrease engagement with other devices or mechanisms.

Figure 13B:
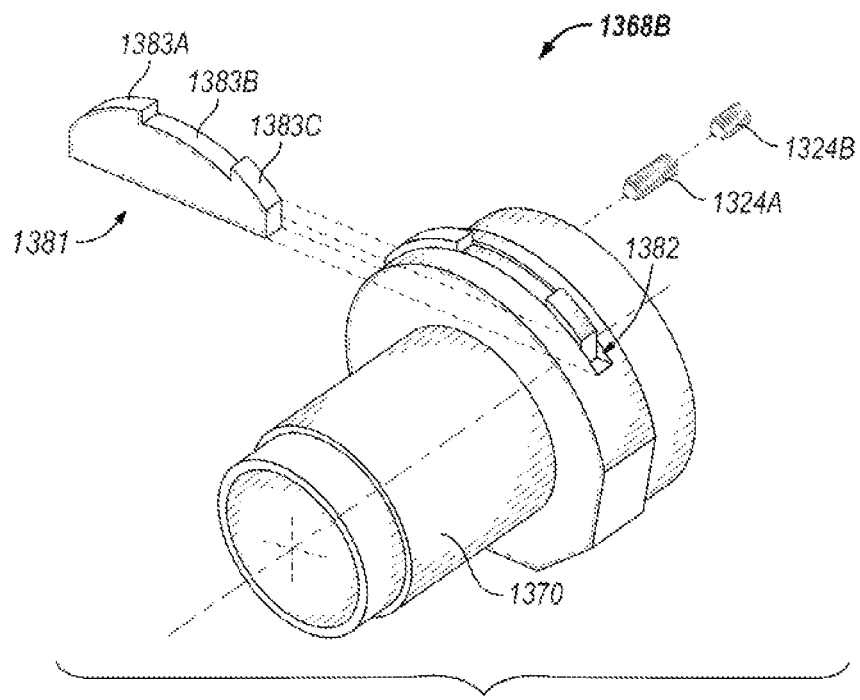
FIG. 13B is a perspective view illustration of an input assembly.

FIG. 13B is a perspective view illustration of an input assembly 1368B. The input assembly 1368A can provide for an adjustable mechanism 1324 to engage with an fixed button 1381. The fixed button 1381 can engage and/or interact with a bearing, roller, set of bearings, cup gear, and/or other devices (not illustrated) that engages or interacts with a ring gear (not illustrated) to cause a rotational movement.

In at least one example, the fixed button 1381 may be placed within a button aperture 1382 that can allow the fixed button 1381, which in a least one example the fixed button 1381 is rectangular and the button aperture 1382 can be sized and shaped to receive the fixed button 1381. The button aperture 1382 allows a portion of the fixed button 1381 to be exposed for engagement and/or interaction with a device or other mechanisms. The button aperture 1382 can be formed and/or manufactured into the input shaft 1370.

The fixed button 1381 can be manufactured and/or formed to allow for a first radius point 1383A, a second radius point 1383C, and/or a securing section 1383B. In at least one example, the securing section 1383B can be engaged by an adjustable mechanism 1324 to secure it within the button aperture 1382. The radius points 1383A/1383C can be utilized to engage with other devices or mechanisms.

Figure 14:
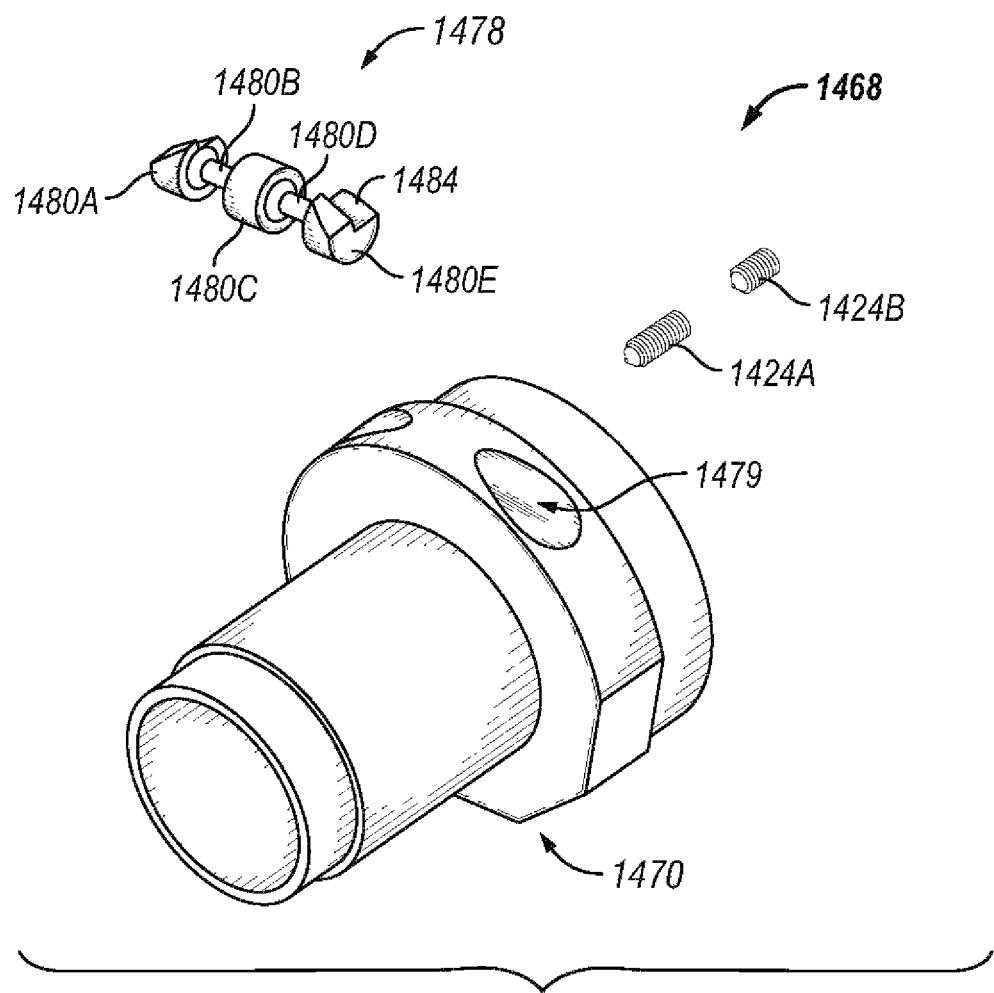
FIG. 14 is an exploded perspective view illustration of an input assembly.

FIG. 14 is an exploded perspective view illustration of an input assembly 1468. The input assembly 1468 can include an input shaft 1470 that can receive one or more adjustable mechanisms 1424A/1424B, an adjustment button 1478, that can be received within a button aperture 1479 within the input shaft 1470. The adjustable mechanism(s) 1424A/1424B may allow for a first adjustable mechanism 1424A to engage with the adjustment button 1478 and a second adjustable mechanism 1424B to secure the first securing mechanism 1424A in position.

The adjustment button 1478 can have multiple sections. The adjustment button 1478, in at least one example, may resemble a bar bell, having a first pivot end 1480A, and a second pivot end 1480E. These pivot ends 1480A/1480B can be coupled to a central engagement point 1480C that allows for an adjustable mechanism 1424A/1424B to cause the positioning of the adjustment button 1478. The pivot ends 1480A/1480E and the central engagement point 1480C may be coupled together through a first coupling section 1480B, and/or a second coupling section 1480D. In at least one example, the coupling sections 1480B/1480D may be removably coupled to one or both of the pivot ends 1480A/1480E and/or the central engagement point 1480C. In some examples, the first pivot end 1480A and the first coupling section 1480B, and/or the second pivot end 1480E and section coupling section 1480D, may be formed, manufactured, and/or permanently coupled together and allow for a removable coupling to the central engagement point 1480C. The adjustment button 1478 may be placed within a button aperture 1479 that passes through the input shaft 1470. In at least one embodiment, the adjustment button 1478 can utilize the pivot ends 1480A/1480E to adjust the engagement or interaction with other devices. For example, the pivot ends 1480A/1480E may have a variable radius along their circumferential surface, which as the central engagement point is adjusted, the pivot ends 1480A/1480E can be rotated to increase and/or decrease engagement with other devices or mechanisms. Additionally, the pivot end(s) 1480A/1480E can have a ledge 1484 that allows for engagement with a device or other mechanism that engages with a cup gear and/or ring gear (not illustrated). The ledge 1484 can also show the difference between the first (smallest) radius and the second (largest) radius of the pivot end(s) 1480A/1480E.

Figure 15A:
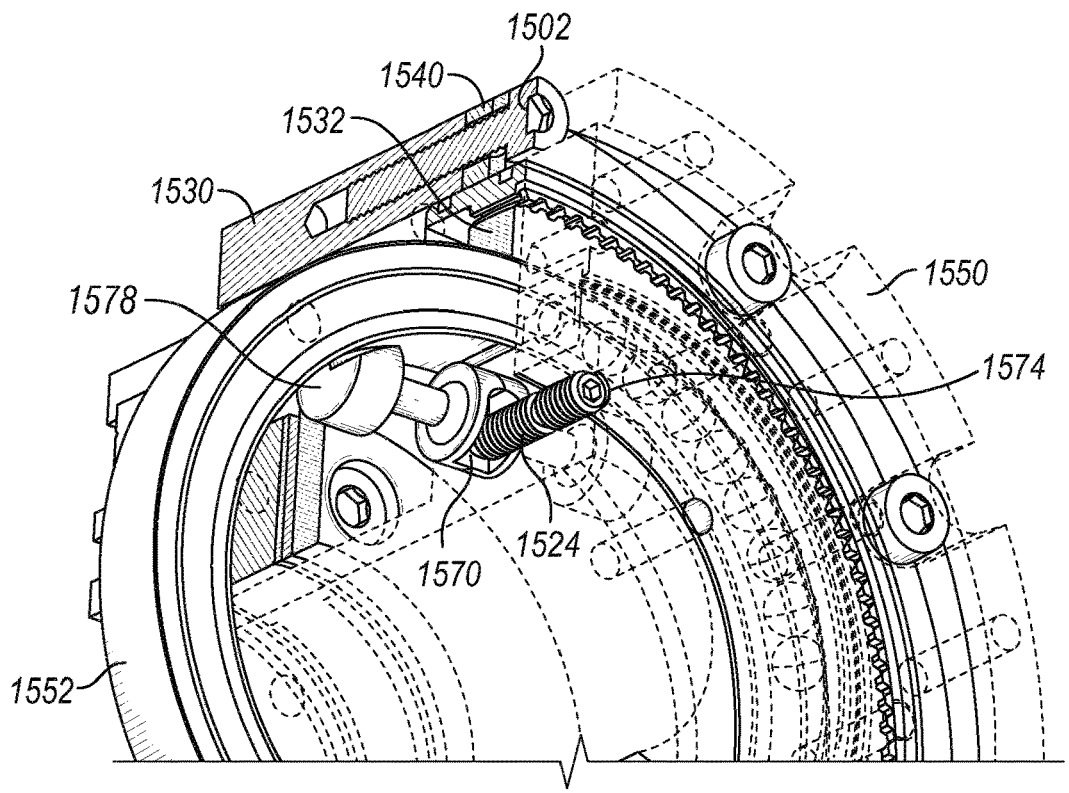
FIG. 15A is a top shadow view illustration of an input assembly.
Figure 15B:
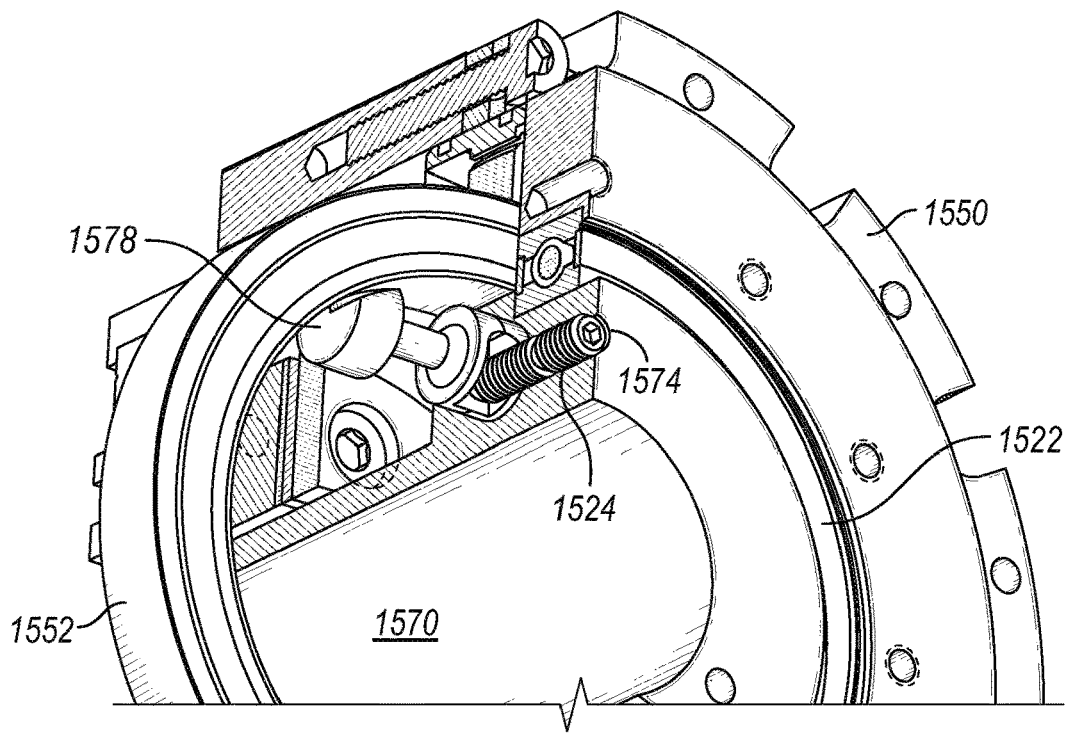
FIG. 15B is a top cutaway view illustration of an input assembly.

FIG. 15A is a top shadow view illustration of an input assembly 1568. FIG. 15B is a top cutaway view illustration of an input assembly 1568. With reference to FIGS. 15A and 15B. An input shaft 1570 can have an interaction with a bearing 1522 that allows the input shaft 1570 to rotate about a lid 1550. The lid 1550 can help contain portions of a gearbox. The lid 1550 can be coupled to a ring gear 1540, and a main body 1530 through a fastener 1502.

The input shaft 1570 can have an adjustment aperture 1574 that allows an adjustment device 1524 to engage with an adjustment button 1578. The adjustment button 1578 can be utilized to engage, in at least one example, a bearing 1552 that can interface with a cup gear 1532. The cup gear 1532 can then engage in a sinusoidal manner with the ring gear 1540. The adjustment button 1578 can have an engagement void 1585 that allows the securing mechanism 1524 to be received. As the securing mechanism 1524 is moved, the adjustment button 1578 can be rotated and/or pivoted to cause engagement with a bearing 1552 and/or a cup gear 1532. The engagement allows for a zero backlash, and/or little backlash, based on the adjustment.

Figure 16:
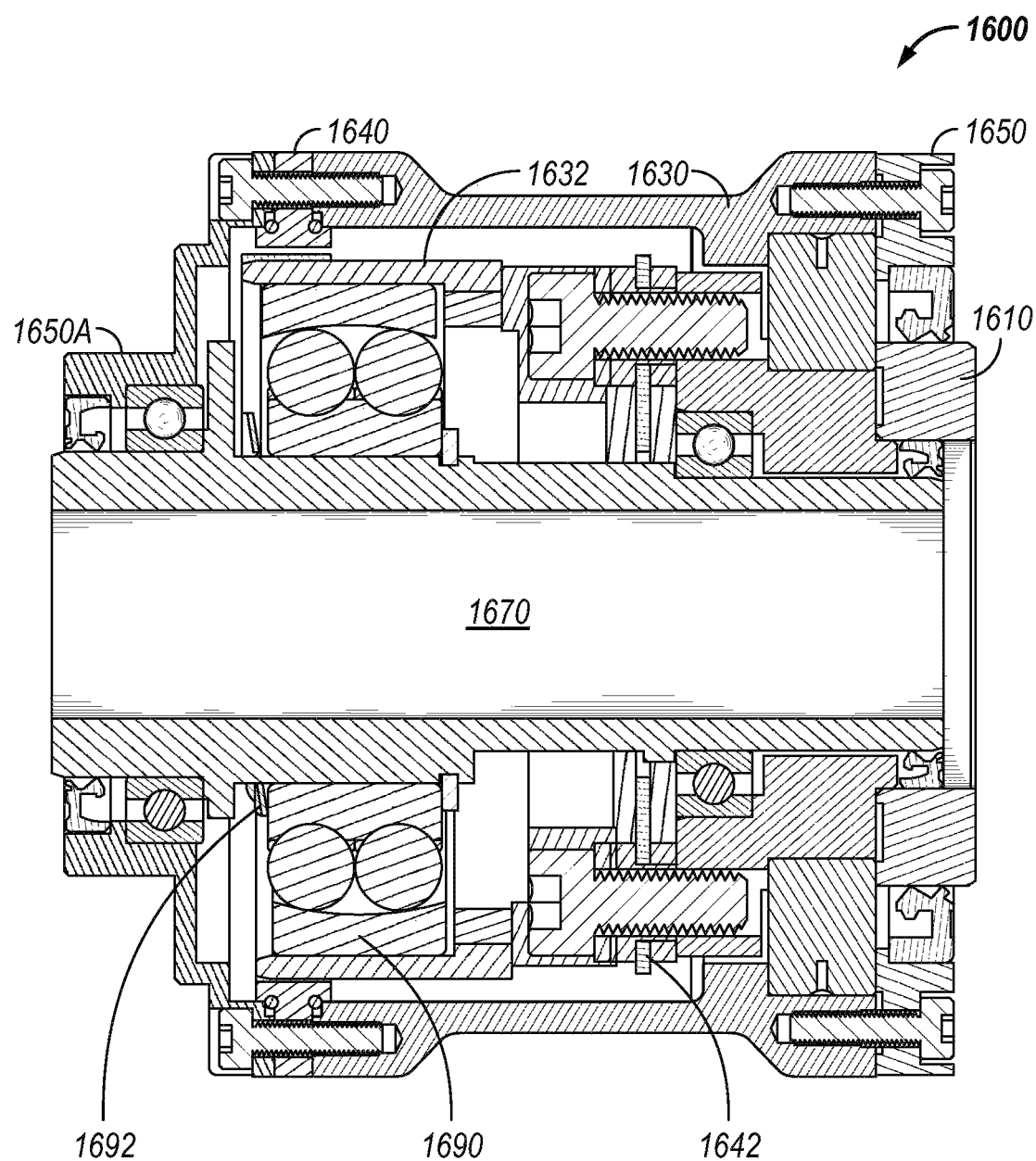
FIG. 16 is a cutaway view illustration of a gearbox.

FIG. 16 is a cutaway view illustration of a gearbox 1600. The gearbox 1600 can have an input shaft 1670 that can be surrounded by a number of other devices and/or mechanism. For example, the input shaft 1670 can have a first lid 1650A and a second lid 1650B, which allow for a main body 1630 to assist in containing the interior of the gearbox 1600. A ring gear 1640 can be utilized to engage with a cup gear 1632. The cup gear 1632 can be engaged with a self-adjusting mechanism 1690 that is biased by a spring 1692. The self-adjusting mechanism 1690 can interact or be engaged with the sloped wall of the cup gear 1632 and as the self adjusting portion causes the cup gear 1632 to move in a sinusoidal manner.

The sinusoidal manner causes a flexible lamination 1642 to flex so that the movement of the cup gear 1632 can be imparted on an output 1610. An example of the sinusoidal manner is one where there is a first engagement point of the cup gear 1632 with the ring gear 1640, the cup gear 1632 then disengages moves a calculated or known distance based on the adjustment of the adjustment button 1678, and then reengages with the ring gear 1640. These gaps of the calculated or known distance can be caused by interactions or flexing of the flexible lamination 1642, which can be coupled to the output 1610.

Figure 17:
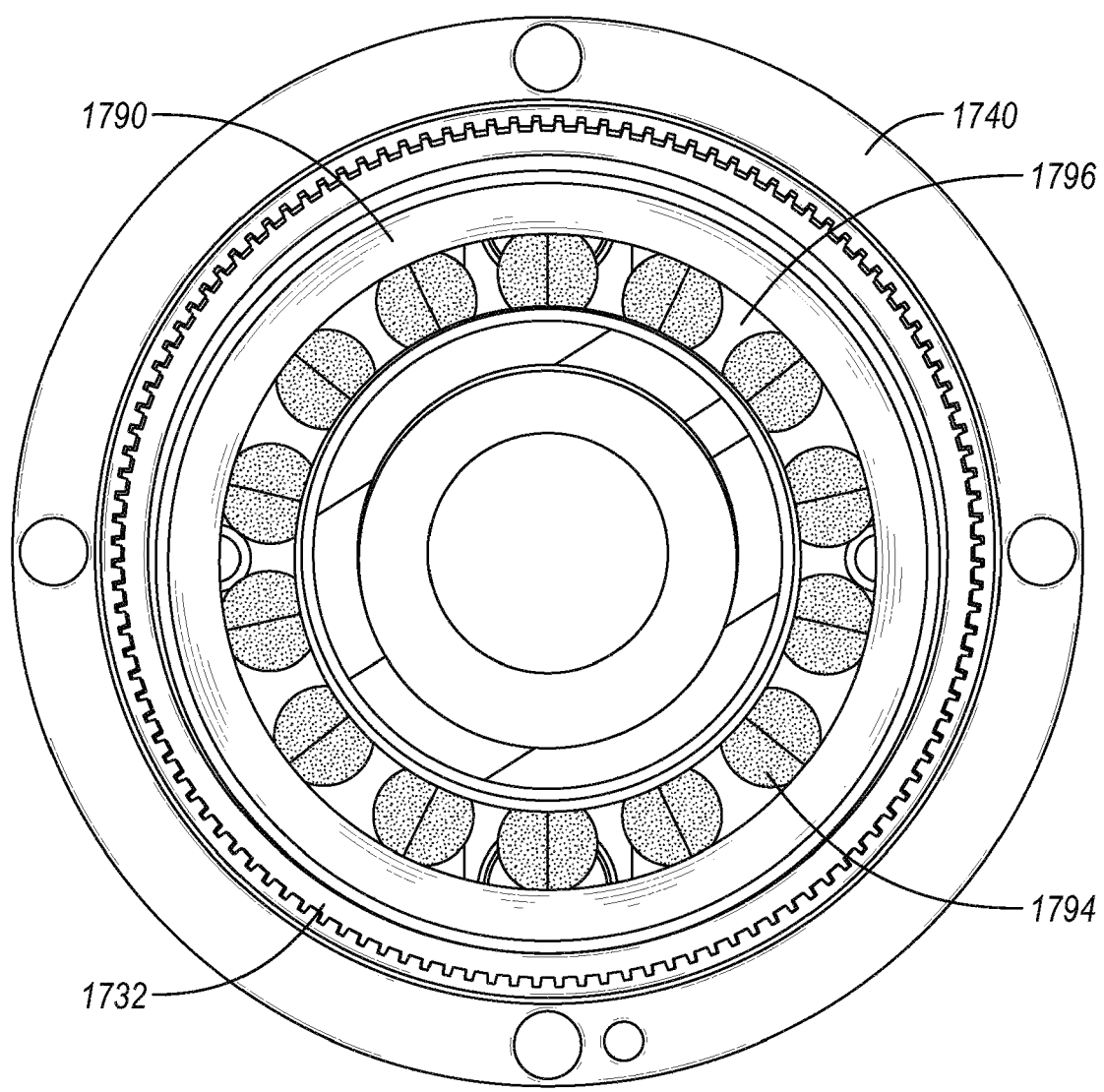
FIG. 17 is a top view illustration of a gear assembly.

FIG. 17 is a top view illustration of a gear assembly. The self-adjusting mechanism 1790 can cause the cup gear 1732, to engage with a ring gear 1740. The cup gear 1732 may move in a sinusoidal manner, based on the transition of ball bearings or roller(s) 1794 within the track 1796. As the self adjusting mechanism 1790 is rotated, if it is off balance, for example, the angle of the self adjusting mechanism 1790 changes, the ball bearings or roller(s) 1794 may congregate on one section of the track 1796. As they congregate, they can then shift and then realign with causes rotation and/or cup gear 1732 to jump or move a specified or calculated distance while it is disengaged.

Figure 18:
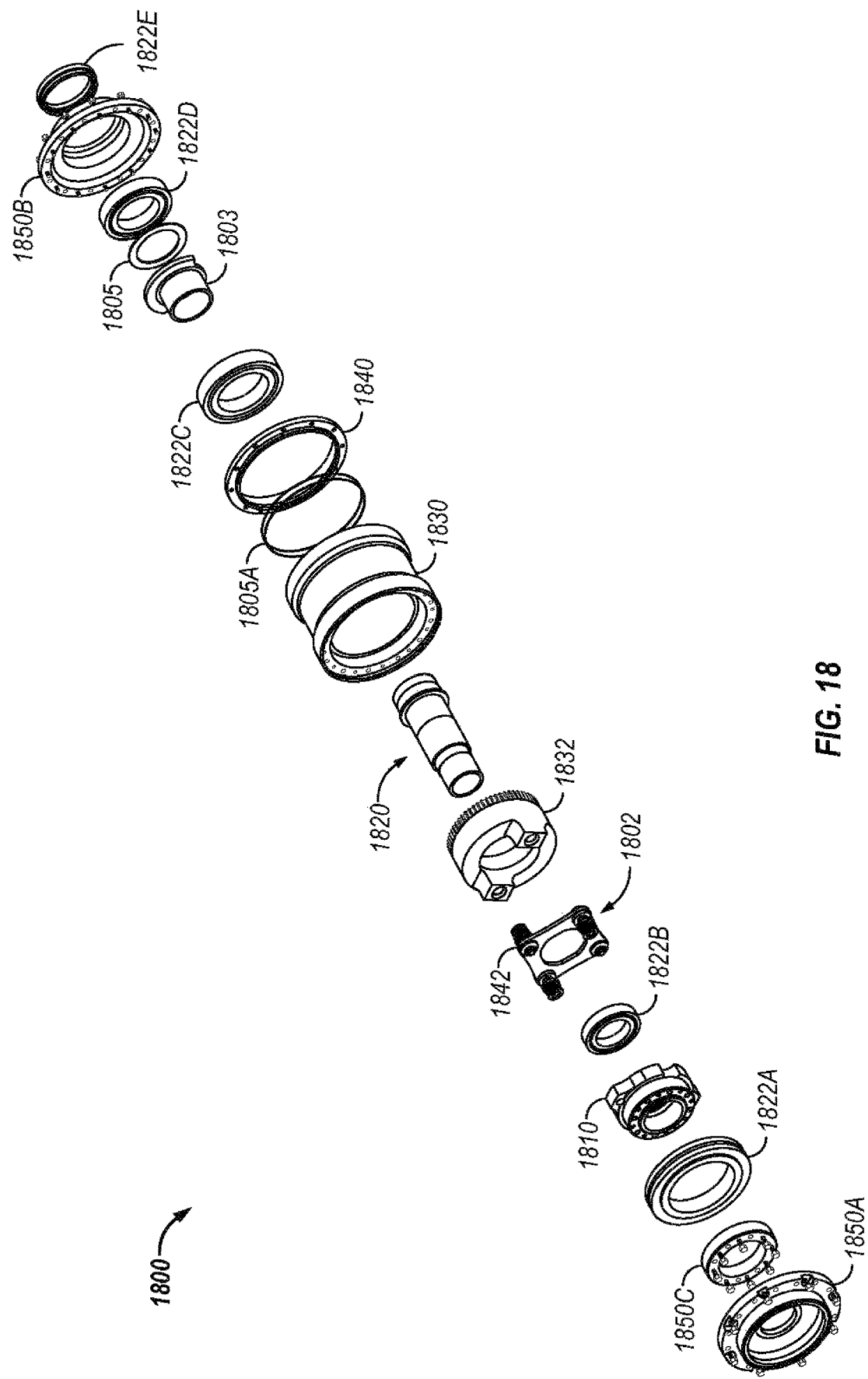
FIG. 18 is an exploded view of a flexdrive.

FIG. 18 is an exploded view of a flexdrive 1800. The flexdrive 1800 can have an output 1810 that is concentrically arranged around an input shaft 1820 and/or an input bearing 1822E (other bearings can include output bearing 1822A, flex bearing 1822B, bushing bearing 1822C, and/or lid bearing 1822D all which may be referenced as bearing 1822). It would be understood that bearing could also mean rollers, or sets of bearings, ball bearings, and/or rollers. In at least one example, the output 1810 can have a seal 1805A and/or 1805B and a main body 1830 concentrically arranged around output 1810. In at least one embodiment, the main body 1830 can be coupled to a ring gear 1840, which may be coupled to a lid 1850A and/or lid 1850B, or lid aligner 1850C.

The flexdrive 1800 is a set of concentric components. A subset of those components could be considered stationary or a ground set. A second subset rotates at high speed and low torques or an input set. A third subset rotates at low speed and high torques, or output set. The ground set, in at least one example, can comprise the main body 1830, ring gear 1840, and/or lid(s) 1850A/1850B. The ground set may also include other machine elements that ease movement and/or rotation such as bearings, seals, and fasteners. This allows the Ground Set to remain stationary as the other sets rotate in a concentric fashion about the Ground set. In at least one example, the Ground Set can be bolted to other stationary elements like plates or proper structures of different shapes. In some examples, the Ground set may include ports for grease, oil or similar, and/or may include access ports to adjust for backlash.

The input shaft 1820 can interface the bearings 1822 that allow the input shaft 1820 to rotate freely in relation to other portions of the flexdrive 1800. For example, the bearing 1822E can be placed between the input shaft 1820 and the lids 1850A/1850B. This allows the input shaft 1820 to rotate in relation to the lids 1850A/1850B with ease. Similarly, input bearing 1822E can be placed between the input shaft 1820 and the output 1810. This allows for movement flexibility of the output 1810 and the input shaft 1820. The cup gear 1832 can then engage with the ring gear 1840. The input shaft 1820 may also interface with an orbital bushing 1803 that allows for proper alignment of the seals 1805A/1805B, bearings or aligners 1822A/1822B/1822C/1822D/1822E or other elements of the flexdrive 1800.

The ring gear 1840 can be coupled to the lids 1850A/1850B and the main body 1830 through fastener(s) 1802. The ring gear 1840 can be stationary in relation to the lids 1850A/1850B and the main body 1830. The ring gear 1840 may include one or more sets of gear teeth. A set can include one or more of an element. The cup gear 1832 can include one or more sets of gear teeth that may engage with the one or more sets of gear teeth of the ring gear 1840. In at least one example, the cup gear 1832 can be coupled to a flexible laminate 1842 can be coupled to the output 1810. In at least one embodiment, the flexible laminate 1842 can allow for the input shaft 1820 to impart a movement on the output 1810 via the ring gear 1840 and/or the cup gear 1832.

In at least one example, the output may have one or more seals 1805A/1805B that prevent materials from entering the area around and/or surrounding bearings 1822, the input shaft 1820, and/or flexible laminates 1842. Because of the tolerances for the flexdrive 1800, any material, including but not limited to, sand, dirt, oils, fibers, and/or other materials that can create friction between two parts, can cause significant damage or failure of the flexdrive 1800.

The output set can comprise the Output, Output Flexible Laminations, Solid Coupler, Cup Gear Flexible Laminations, and a Cup Gear. In at least one embodiment, the output set may comprise other machine elements, such as, but not limited to, bearings and fasteners. It would be understood that the Output Set is a concentric assembly at its normal state but can bend per the Flexible Laminations. In at least one example, the Output Set can be mounted concentrically to the Ground Set by one, two, or more bearing elements. The Output can only rotate on its axis concentric to the Ground Set axis. The combination of the Output Flexible Laminations, Cup Gear Flexible Laminations, and/or Cup Gear are assembled in a series or daisy chain fashion. Because of the Flexible Laminations, the Cup Gear can be forced off-center with a relatively small force compared to the forces transmitting torque. In at least one embodiment, the Output Set can be designed to allow for high torsional stiffness and relatively low bending stiffness.

In at least one example, an input device coupled to the flexdrive 1800 can cause the input shaft 1820 to impart a motion on the cup gear 1832. The motion may be a sinusoidal motion or manner of motion as the gear does not traverse along ring gear 1840 in a linear or consecutive manner, there are skips and jumps based on the flexible nature of the gear. The flexing of the flexible lamination 1842 causes the cup gear 1832 to move in a jumping or sinusoidal manner, where the cup gear 1832 engages the ring gear 1840 at one point, dis-engages, and then reengages at another point a design specified distance from the first point.

Figure 19:
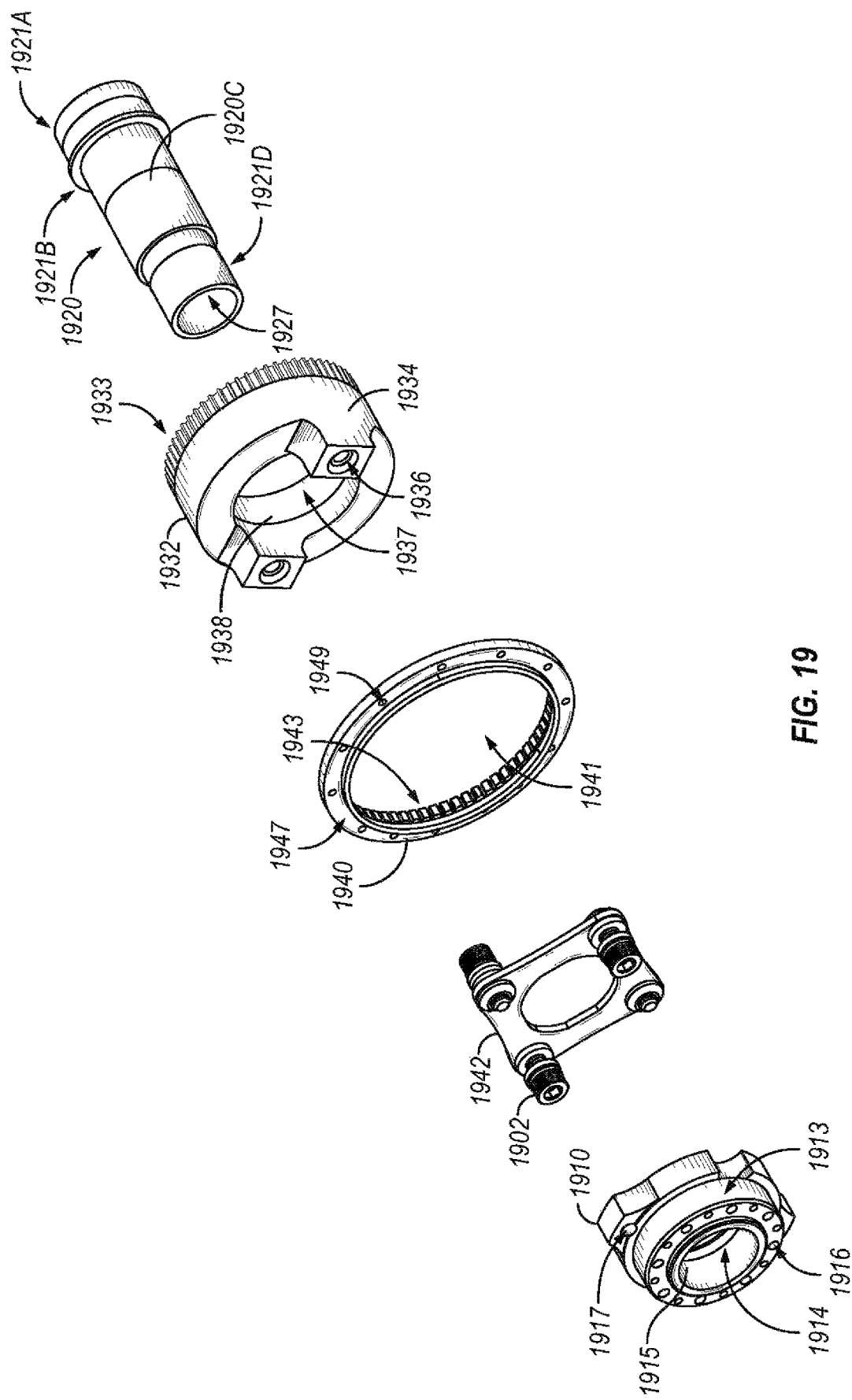
FIG. 19 is an exploded view of the drive elements for a flexdrive including an output, a flexible laminate, a ring gear, a cup gear, and an input shaft.

FIG. 19 is an exploded view of the drive elements for a flexdrive including an output 1910, a flexible laminate 1942, a ring gear 1940, a cup gear 1932, and an input shaft 1920. The output 1910 is generally cylindrical in shape having a central aperture 1914 that allows for an input bearing to be engaged at an input bearing surface 1915. The walls that surround and/or define the central aperture 1914 may have additional holes or apertures, such as but not limited to, threaded apertures 1916 and mounting apertures 1917. In at least one example, the threaded apertures 1916 will allow for the engagement and/or coupling of the output 1910 to other devices, while the mounting apertures allow for engagement or coupling to a flexible lamination 1942. In at least one embodiment, the threaded apertures 1916 and the mounting apertures 1917 may include at least a portion of the internal voids a set of threads or threading along the internal circumferences of the apertures to allow for the coupling with bolts, screws, and/or other fastening mechanisms or devices. The outer circumferential surfaces of the cylindrical body of the output 1910 may include bearing surfaces 1913 that allow for engagement with additional bearings or other rotational freedom devices.

The flexible lamination 1942 can be manufactured from spring or flexible material that allows for deformation of the flexible lamination 1942 by up to 90 degrees without breakage. The degrees that the flexible lamination 1942 can flex can be used to calculate the flexibility coefficient of the flexible laminations, and/or flexdrive. The spring or flexible material may include carbon fiber, plastics, metals, alloys, and/or other similar materials or combinations thereof. The flexible laminations 1942 can include at least one hole or aperture 1919 that allows for bolts, screws, or other fastening devices or mechanism to pass through.

The ring gear 1940 in at least one embodiment is circular having a defined opening 1941. On an internal surface of the defined opening 1941, there can be a set of gear teeth 1943. The mounting surface 1947 may include a plurality (meaning two or more) mounting holes 1949.

The cup gear 1932 is generally circular and in at least one example can have a tiered structure in a direction perpendicular to the diameter of the cup gear 1932. The tiers may include a gear tier, having a set of gear teeth 1933, and a tier below may include an engagement tier and a mounting tier 1934. In at least one embodiment, the mounting tier 1934 can include a plurality of mounting holes 1935, and a plurality of access holes 1936. The tiers may surround a defined opening 1937 that may have the set of gear teeth 1933 on its outer circumference and a bearing surface 1938 on the inner surface.

The input shaft 1920 can have multiple sections: a section 1921A containing a first bearing surface 1923A, an engagement section 1921B, a shaft section 1921C, and a section 1921D having second bearing surface 1923B. The first section 1921A, containing a first bearing surface 1923A, can interface and/or engage with a bearing (not illustrated) to allow for freedom of rotation for the input shaft 1920. The engagement section 1921B can include one or more apertures or holes 1925 that allow for an adjustable engagement device to engage with a bearing or other surface. In at least one embodiment, the adjustable engagement device is a set screw, and the one or more apertures or holes 1925 are tapped to allow for screw, bolt, or other interconnection patterns to be utilized. An interconnection pattern allows for the connection of two elements in a manner that allows for removability or adjustment at a later time. The shaft section 1921C allows for a solid surface where additional portions of a flex drive can rotate about a central axis or in a coaxial manner. In at least one example, additional bearings or other rotational elements may touch or otherwise interact with the shaft section 1921C. The shaft section 1921C may also define a hollow portion 1927 of the input shaft 1920. In at least one example, the hollow portion 1927 may extend the entire length of the input shaft 1920. Alternatively, if more weight is desired the hollow portion 1927 may extend partially along the length of the input shaft 1920. The second section 1921D, containing a second bearing surface, 1923B can interface and/or engage with a bearing (not illustrated) to allow for freedom of rotation for the input shaft 1920.

Figure 20:
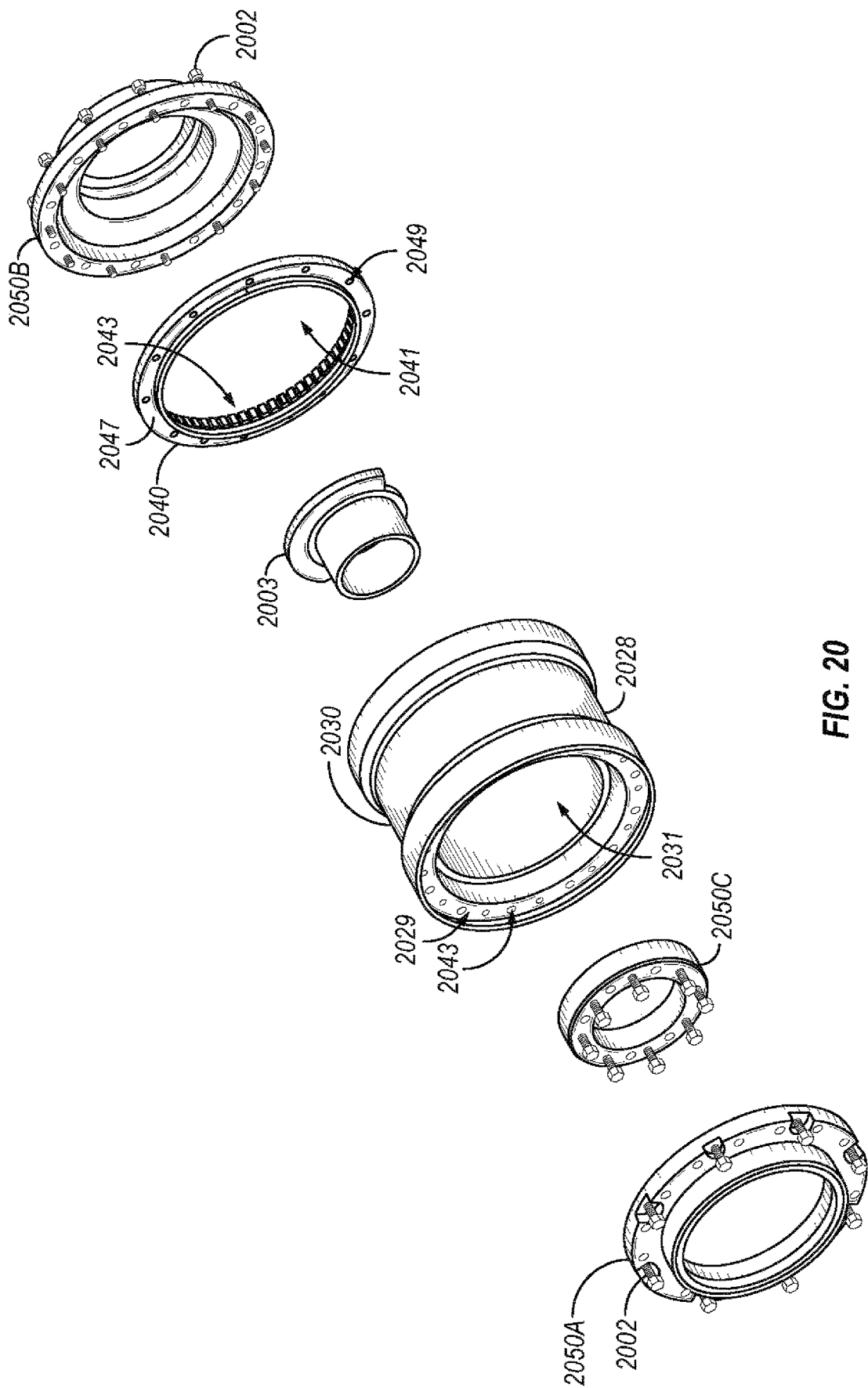
FIG. 20 is an exploded view of the containment or alignment portions of a flexdrive, including the lids with the lid aligner, the main body, the orbital bushing, and ring gear.

FIG. 20 is an exploded view of the containment or alignment portions of a flexdrive, including the lids 2050A/2050B with the lid aligner 2050C, the main body 2030, the orbital bushing 2003, and ring gear 2040. The orbital bushing 2003 allows for the alignment of various gear or drive components and control of the various components. The lids 2050A/2050B may include a central aperture 2046 that is surrounded by the lids 2050A/2050B. In at least one embodiment, the lids 2050A/2050B may be a ring having multiple sections. for example, there may be a section having a bearing surface(s) 2048 for engaging with bearings, rollers, or other devices or mechanisms that allow for rotational freedom of movement. Another section of the lids 2050A/2050B can be utilized for a mounting surface that allows for mounting apertures 2051 to pass through it. The mounting apertures 2051 may be utilized to pass through or engage fasteners that can couple and/or secure the lids 2050A/2050B with other items, devices, or mechanism of a flexgear.

The main body 2030 can have a cylindrical body 2028 coupled to a mounting surface 2029. In at least one embodiment, the cylindrical body 2028 can be utilized for engagement with bearings or other devices or mechanisms for rotational freedom of movement, as well as serving as a container for the gearing mechanism (not illustrated). In at least one example, the cylindrical body 2028 may also allow for an internal bearing surface 2031 that can allow for engagement with devices or mechanisms such as bearings or rollers that allow for rotational freedom of movement.

The mounting surface 2029 may include a ledge or extension that extends past the cylindrical body 2028 by a depth that allows for at least one mounting aperture 2039 and/or at least one threaded aperture 2071. In at least on example, the at least one mounting aperture 2039 may be threaded or smooth to allow for fasteners to couple the main body 2030 to other portions of a flexgear, and similarly, the at least one threaded aperture 2071 may be threaded to allow for engagement by a fastener to secure items to the main body 2030.

The ring gear 2040 in at least one embodiment is circular having a defined opening 2041. On an internal surface of the defined opening 2041, there can be a set of gear teeth 2043. A locating surface 2045 can be adjacent to the set of gear teeth 2043 on the outer surface of the defined opening 2041. In at least one example, the locating surface 2045 may be adjacent to a mounting surface 2047. The mounting surface 2047 may include a plurality (meaning two or more) mounting holes 2049.

Figure 21A:
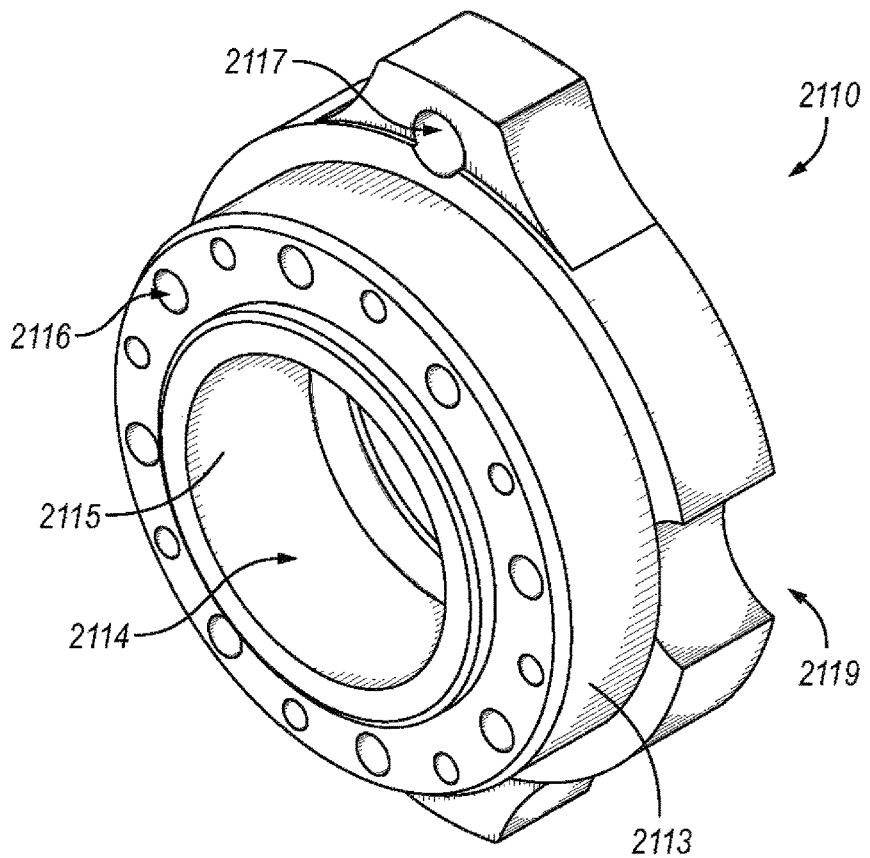
FIG. 21A is a front perspective view of an output.
Figure 21B:
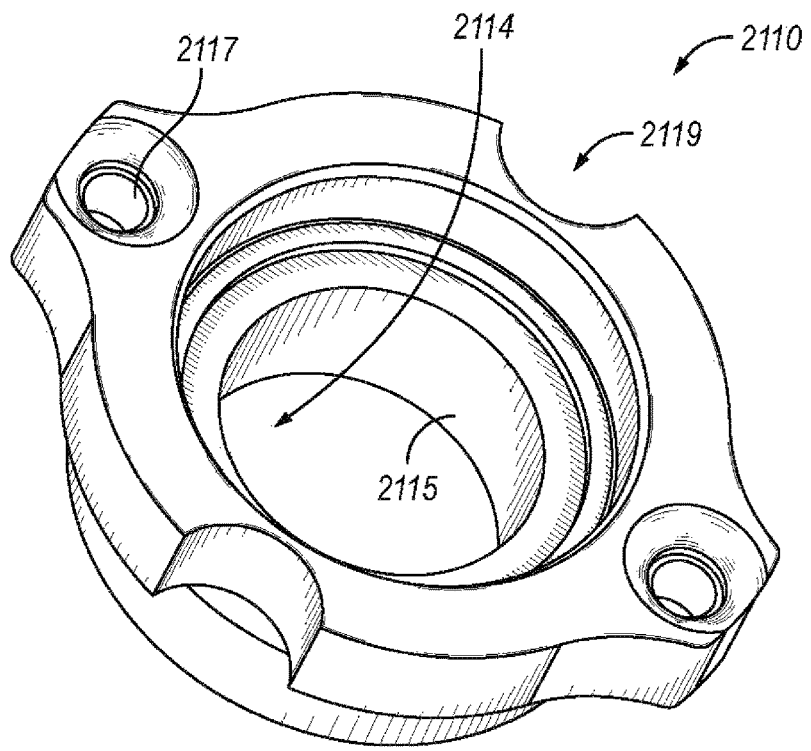
FIG. 21B is a back perspective view of an output.

FIG. 21A is a front perspective view of an output 2110. FIG. 21B is a back perspective view of an output 2110. With reference to FIGS. 21A and 21B. The output 2110 is generally cylindrical in shape having a central aperture 2114 that allows for an input bearing to be engaged at an input bearing surface 2115. The walls that surround and/or define the central aperture 2114 may have additional holes or apertures, such as but not limited to, threaded apertures 2116 and mounting apertures 2117. In at least one example, the threaded apertures 2116 will allow for the engagement and/or coupling of the output 2110 to other devices, while the mounting apertures allow for engagement or coupling to a flexible lamination (not illustrated). In at least one embodiment, the threaded apertures 2116 and the mounting apertures 2117 may include at least a portion of the internal voids, a set of threads or threading along the internal circumferences of the apertures to allow for the coupling with bolts, screws, and/or other fastening mechanisms or devices. There may also be mounting voids 2119 that allow for other mounting devices to pass near the output 2110. The outer circumferential surfaces of the cylindrical body of the output 2110 may include bearing surfaces 2113 that allow for engagement with additional bearings or other rotational freedom devices.

Figure 22A:
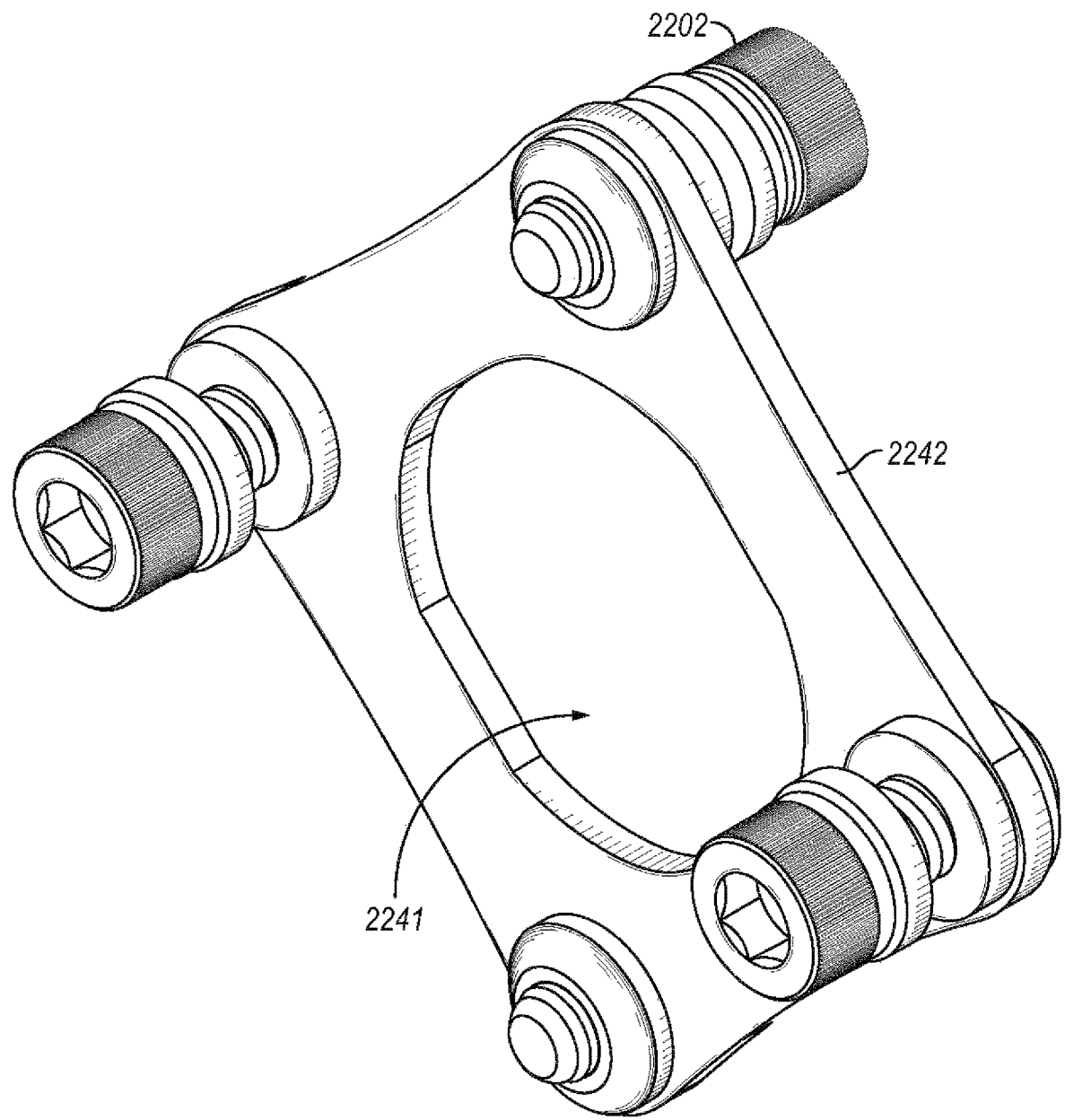
FIG. 22A is a perspective view of a flexible laminate.
Figure 22B:
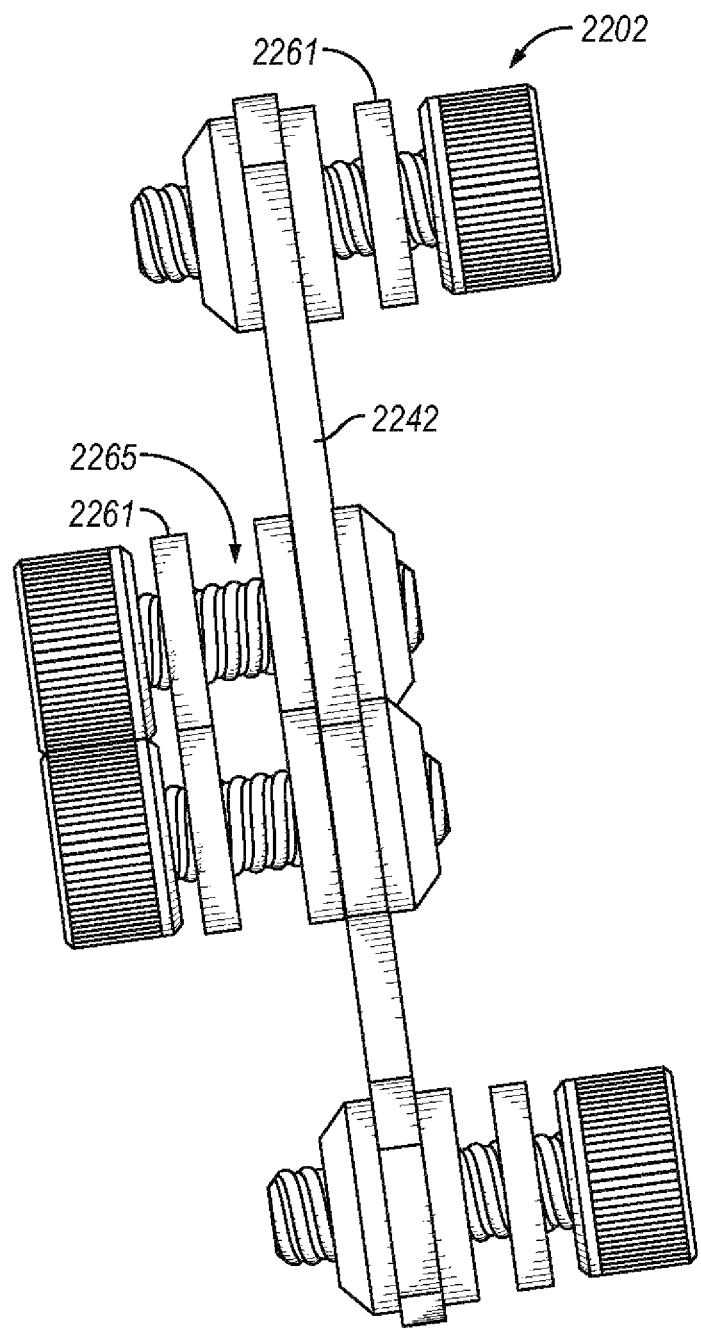
FIG. 22B is a side view of a flexible laminate.

FIG. 22A is a perspective view of a flexible laminate 2242. FIG. 22B is a side view of a flexible laminate 2242. With reference to FIGS. 22A and 22B. The flexible lamination 2242 can be manufactured from spring or flexible material 2218 which allows for deformation of the flexible lamination 2242 by up to 90 degrees without breakage. The degree that the flexible lamination 2242 can flex can be used to calculate the flexibility coefficient of the flexible laminations, and/or flexdrive. The spring or flexible material 2218 may include carbon fiber, plastics, metals, alloys, and/or other similar materials or combinations thereof. The flexible laminations 2242 can include at least one hole or aperture 2219 that allows for bolts, screws, or other fastening devices or mechanism to pass through.

Figure 23A:
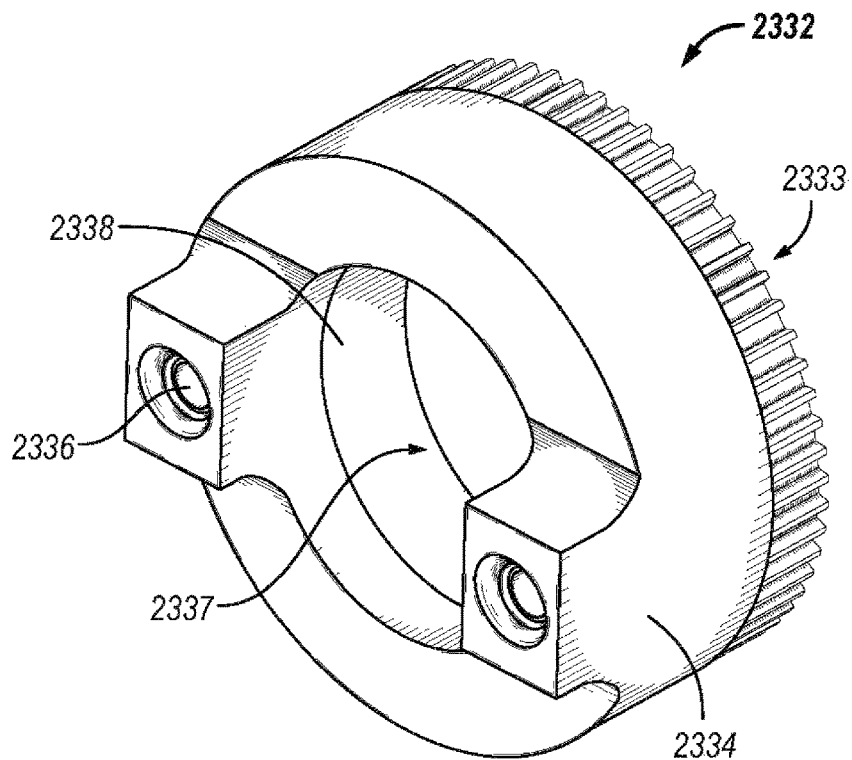
FIG. 23A is a front perspective view of a cup gear.
Figure 23B:
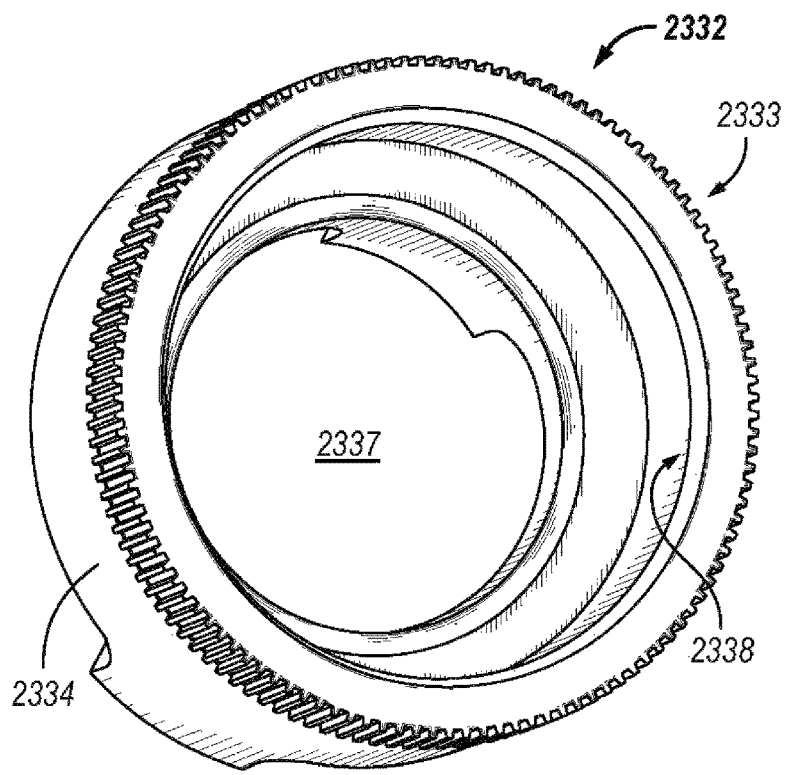
FIG. 23B is rear perspective view of a cup gear.

FIG. 23A is a front perspective view of a cup gear 2332. FIG. 23B is rear perspective view of a cup gear 2332. With reference to FIGS. 23A and 23B. The cup gear 2332 is generally circular and in at least one example can have a tiered structure in a direction perpendicular to the diameter of the cup gear 2332. The tiers may include a gear tier, having a set of gear teeth 2333, and a tier below may include an engagement tier and a mounting tier 2334. In at least one embodiment, the mounting tier 2334 can include a plurality of mounting holes 2335, and a plurality of access holes 2336. The tiers may surround a defined opening 2337 that may have the set of gear teeth 2333 on its outer circumference and a bearing surface 2338 on the inner surface.

Figure 24A:
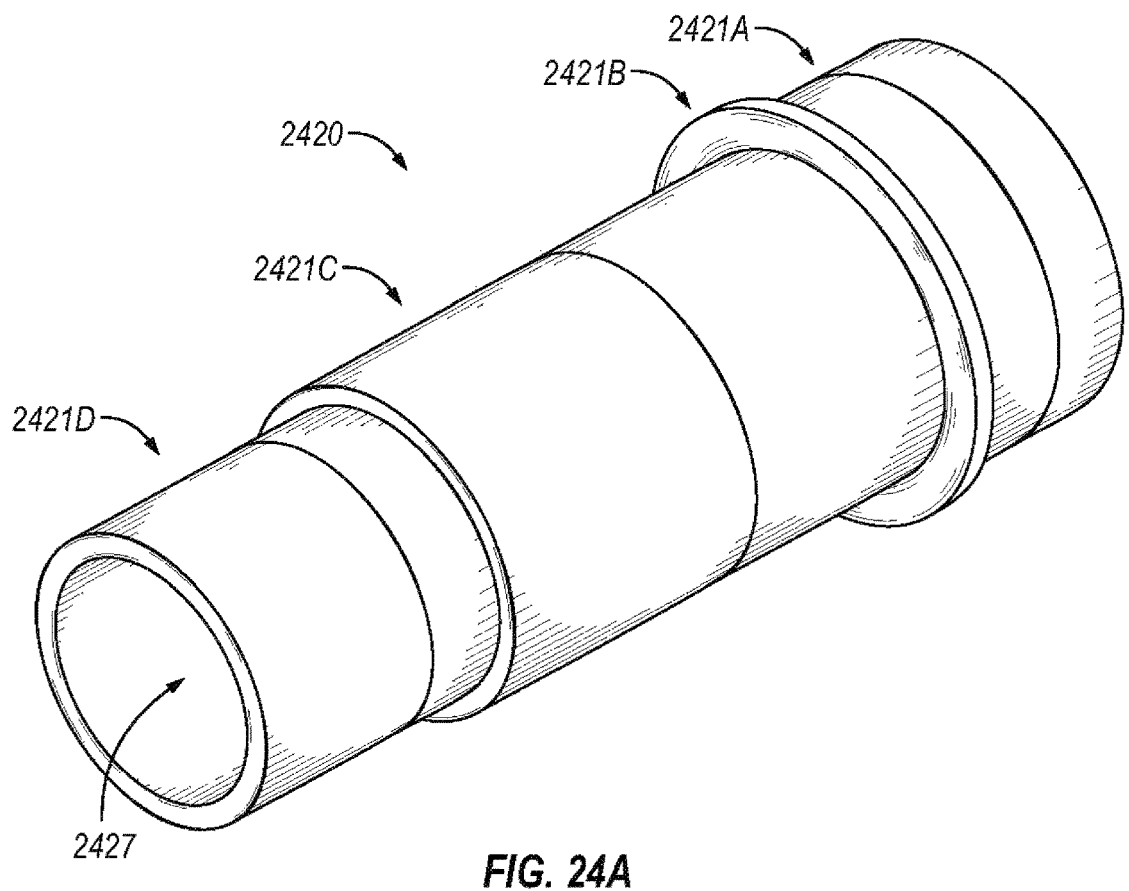
FIG. 24A is a perspective view illustration of an input shaft.
Figure 24B:
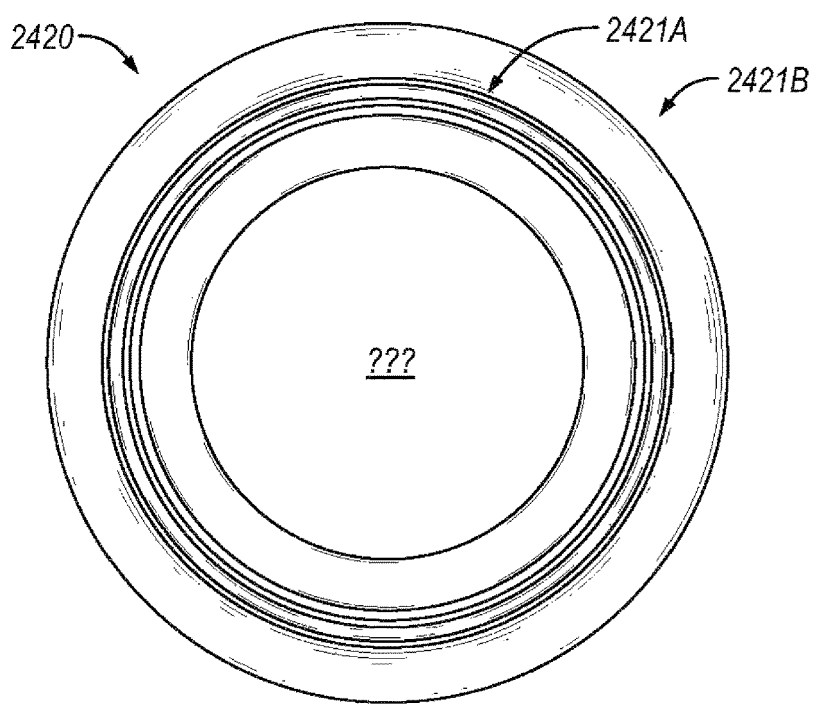
FIG. 24B is an end view illustration of an input shaft.

FIG. 24A is a perspective view illustration of an input shaft 2420. FIG. 24B is an end view illustration of an input shaft 2420. With reference to FIGS. 24A and 24B. The input shaft 2420 can have multiple sections; a section 2421A containing a first bearing surface 2423A, an engagement section 2421B, a shaft section 2421C, and a section 2421D having second bearing surface 2423B. The first section 2421A, containing a first bearing surface 2423A, can interface and/or engage with a bearing (not illustrated) to allow for freedom of rotation for the input shaft 2420. The engagement section 2421B can include one or more apertures or holes 2425 that allow for an adjustable engagement device to engage with a bearing or other surface. In at least one embodiment, the adjustable engagement device is a set screw, and the one or more apertures or holes 2425 are tapped to allow for screw, bolt, or other interconnection patterns to be utilized. An interconnection pattern allows for the connection of two elements in a manner that allows for removability or adjustment at a later time. The shaft section 2421C allows for a solid surface where additional portions of a flex drive can rotate about a central axis or in a coaxial manner. In at least one example, additional bearings or other rotational elements may touch or otherwise interact with the shaft section 2421C. The shaft section 2421C may also define a hollow portion 2427 of the input shaft 2420. In at least one example, the hollow portion 2427 may extend the entire length of the input shaft 2420. Alternatively, if more weight is desired the hollow portion 2427 may extend partially along the length of the input shaft 2420. The second section 2421D, containing a second bearing surface, 2423B can interface and/or engage with a bearing (not illustrated) to allow for freedom of rotation for the input shaft 2420.

Figure 25A:
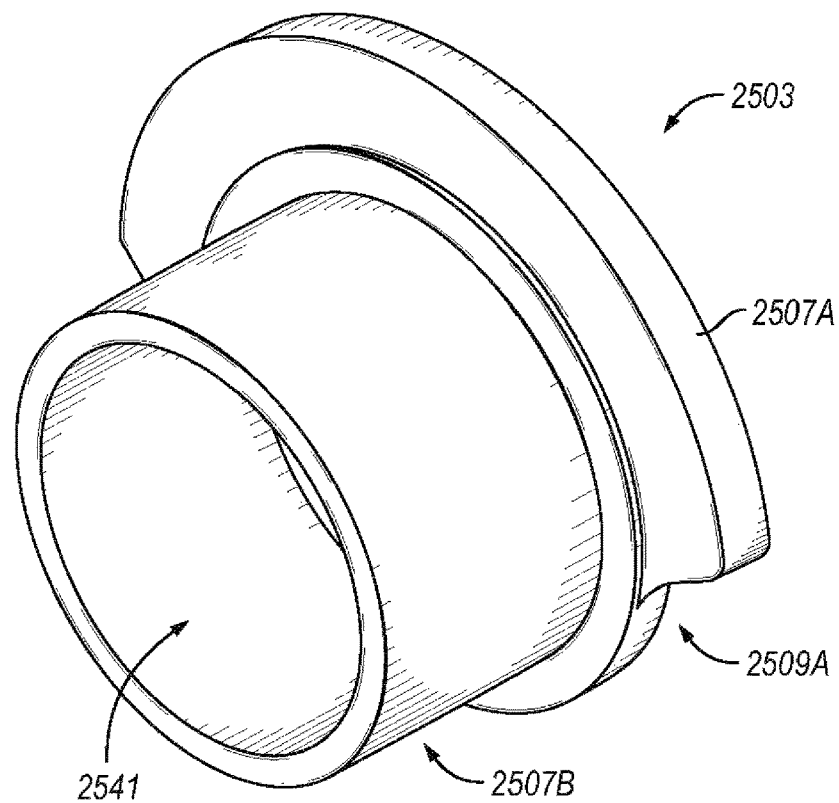
FIG. 25A is a front perspective view of an orbital bushing.
Figure 25B:
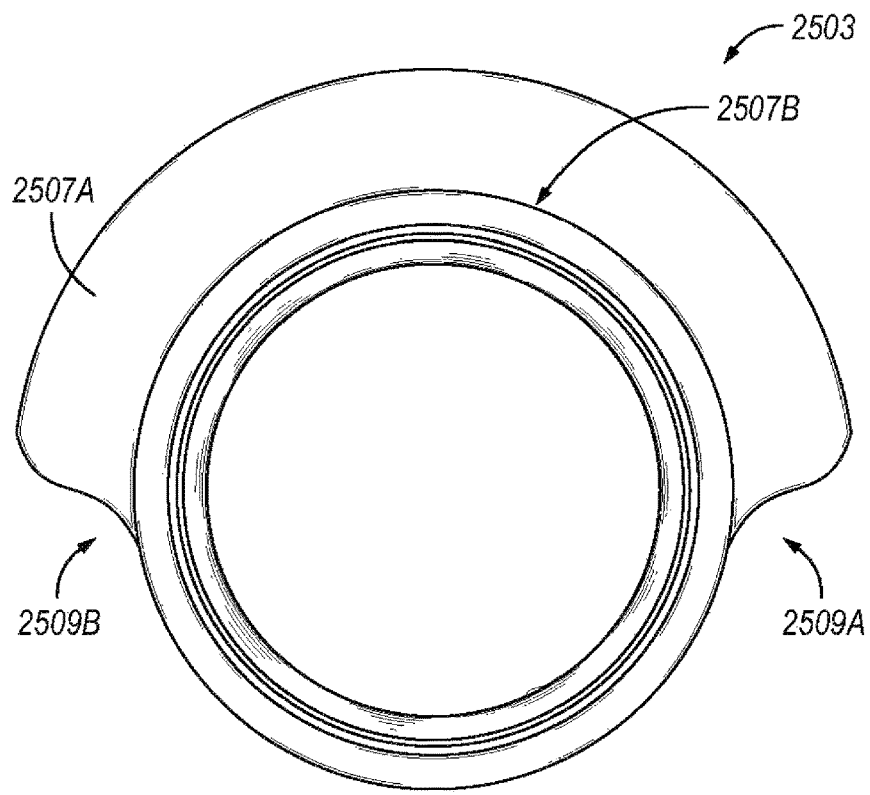
FIG. 25B is an end view of an orbital bushing.

FIG. 25A is a front perspective view of an orbital bushing 2503. FIG. 25B is an end view of an orbital bushing 2503. With reference to FIGS. 25A and 25B. The orbital bushing 2503 allows for the rotation of the input shaft in a proper alignment. In at least one example, the alignment section 2507A of the orbital bushing 2503 causes part of the change in position of the cup gear in relation with the input shaft, while in other examples the alignment section 2507A allows for movement to be minimized. An engagement section 2507 can engage with one or more of a bearings, the input shaft, cup gear, and/or main body. A first alignment turn 2509A and a second alignment turn 2509B may be used for positioning, alignment, or movement of the orbital bushing 2503 about a central aperture 2541.

Figure 26A:
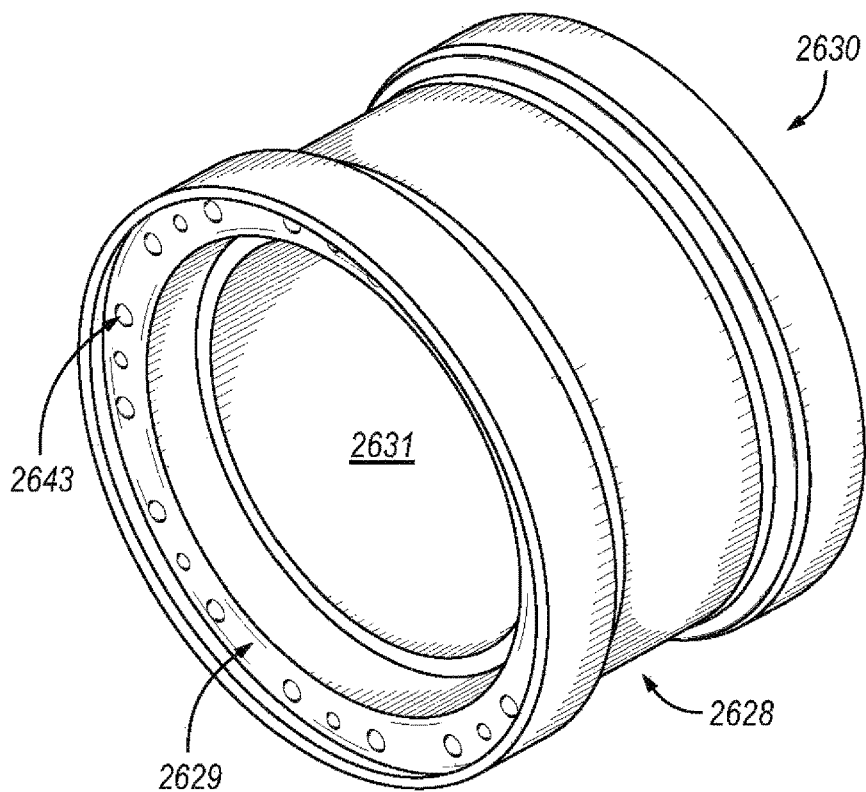
FIG. 26A is a front perspective view of a main body.
Figure 26B:
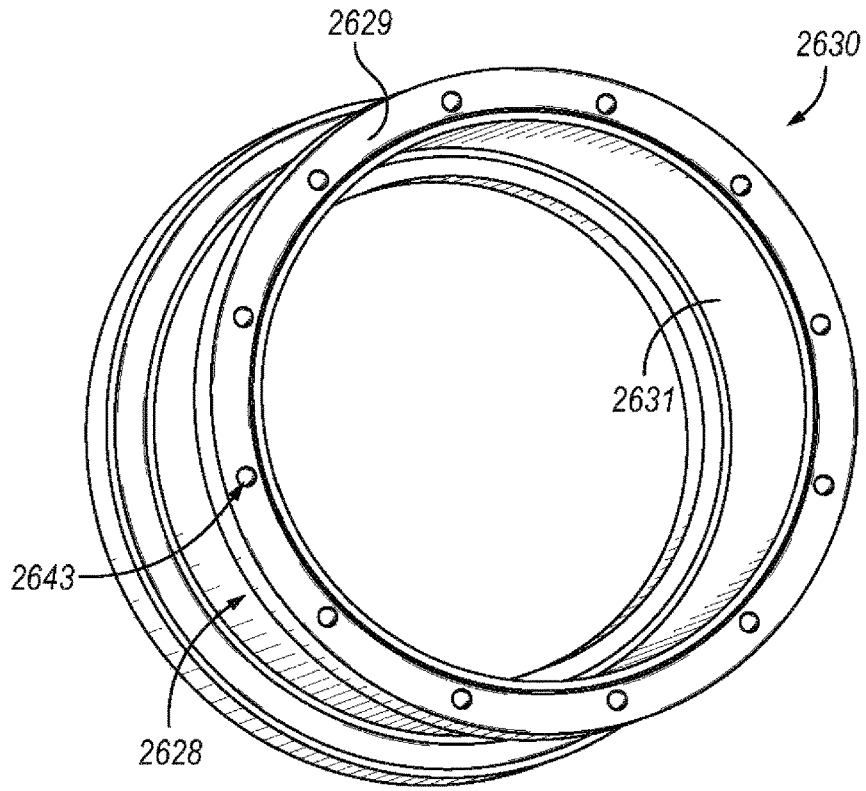
FIG. 26B is a rear perspective view of a main body.

FIG. 26A is a front perspective view of a main body 2630. FIG. 26B is a rear perspective view of a main body 2630. With reference to FIGS. 26A and 26B. The main body 2630 can have a cylindrical body 2628 coupled to a mounting surface 2629. In at least one embodiment, the cylindrical body 2628 can be utilized for engagement with bearings or other devices or mechanisms for rotational freedom of movement, as well as serving as a container for the gearing mechanism (not illustrated). In at least one example, the cylindrical body 2628 may also allow for an internal bearing surface 2631 that can allow for engagement with devices or mechanisms such as bearings or rollers that allow for rotational freedom of movement.

The mounting surface 2629 may include a ledge or extension that extends past the cylindrical body 2628 by a depth that allows for at least one mounting aperture 2639 and/or at least one threaded aperture 2671. In at least one example, the at least one mounting aperture 2639 may be threaded or smooth to allow for fasteners to couple the main body 2630 to other portions of a flexgear, and similarly, the at least one threaded aperture 2671 may be threaded to allow for engagement by a fastener to secure items to the main body 2630. Zero backlash is produced by movements of the input shaft (shown in FIGS. 24A and 24B) that force the cup gear off center, the external cup gear teeth will get closer and closer to the ring gear teeth until a proper zero backlash fit is produced. In at least one example, a set screw or adjustable mechanism may be utilized and may include a locking feature or element to secure it in its proper position. Because of the location of the teeth meshing a triangular structure can be formed. This triangular structure does the following: it creates a stable balanced distribution of forces; it allows a certain degree of compliance that makes the assembly less sensitive to tolerance changes (changes in geometries); and/or it is less sensitive to solid particles floating around the lubricants. Other examples under this application may include spring loaded set screw elements. The flexible laminations allows for zero backlash on the connection between the cup gear to the output. Providing that the fasteners are torqued and locked.

The torsional stiffness can be dependent on the rigidity between all connecting elements, from the input shaft to the output. The torsional stiffness on the flexdrive can be adjusted to a certain degree by the number, material, and thickness of the flexible laminations. It is expected that many configurations will make the flexdrive adaptable to different torsional stiffness values depending on the application.

Gear tooth geometries can produce a separation force proportional to the load/torque applied. Similarly, the separation forces increase the distance between connecting teeth. However, the flexdrive includes self-locking gear teeth that reduces the distance between connecting teeth. This is the result of how the adjustable set screws interact with the cup gear. As load is applied to the output, the cup gear tends to move with the same direction. Because of the triangular structure (set screws and meshing contact) the cup gear will pivot on one of the set screws in the direction that will reduce the distance between the meshing teeth. This has the benefit of maintaining the contact tooth geometry under loads or changing loads. Maintaining a constant tooth geometry is important for the performance of any mechanical device.

Transmission error is defined as "the difference between the actual position of the output gear and the position it would occupy if the gear drive were perfectly conjugate" Mechanism and Machine Theory, 2021. All coupling mechanisms carry to some extent a transmission error. The flexdrive is no different, but there are a set of design features to minimize the transmission error:

Hypocycloidal tooth geometry optimization. From simple straight to sophisticated polynomial curves geometries, the entire topic is large and complex and, in many ways, dependent on testing. The flexdrive in the present configuration utilizes a simple straight teeth geometry with a cylindrical/straight extruded cut. Additionally, the present version of the cup gear engages with the ring gear at a small angle. Other embodiments engage in a typical straight fashion. It is fair to say that for each case, there is a real working optimal solution. Some solutions are easy to represent mathematically, and others are difficult or impossible to represent mathematically.

Manufacturing tooth geometries adds another layer of complexity. Current manufacturing techniques introduce limitations. In general, manufacturing techniques able to generate complex geometries lack the tolerances needed for precision gearboxes. The manufacturing techniques able to generate precision tolerances are limited to a small set of tooth geometries. From the large set of tooth geometries, only a small set are optimal for hypocycloidal applications. From that set, an even smaller set is manufacturable and finally a subset has optimal transmission errors. Flexible couplings also introduce additional transmission errors. It can be imagined the complete cup gear, flexible laminations. Solid coupler flexible laminations, and output assembly as a typical flexible shaft coupler.

In general, coupling designs that minimize transmission error mirror a plane at the center of the solid coupler body. The flexdrive shows circular flexible laminations with a six bolt pattern. The flexdrive is not limited to this design, and many other options are included depending on the materials used and other factors like the thickness of the laminations. Even though flexible laminations have been used in multiple mechanical applications, the mathematical representations are limited, and a great deal of effort is required to test and find the optimal solutions that reach the performance, reliability, and life required. Showing a transmission error under no load is not enough for the industry requirements. It is required to maintain a low transmission error under load. The flexdrive's self-locking feature allows for the gear teeth to interconnect fully and prevent backlash.

While this disclosure has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

While various embodiments in accordance with the principles disclosed herein have been described above, it should be understood that they have been presented by way of example only and not limitation. Thus, the breadth and scope of this disclosure should not be limited by any of the above-described exemplary embodiments but should be defined only in accordance with any claims and their equivalents issuing from this disclosure. Furthermore, the above advantages and features are provided in described embodiments but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that certain technology is prior art to any embodiment(s) in this disclosure. Neither is the "Brief Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, which are protected thereby. In all instances, the scope of such claims shall be considered on their own merits in light of this disclosure but should not be constrained by the headings set forth herein.

We claim:

1. A flex drive system comprising:
    an input configured to be coupled to a motor or drive, wherein the input has a plurality of engagement devices removably coupled to the input;
    a cup gear removable coupled to a flexible laminate and engaged by the input on a bearing surface;
    a ring gear that is partially engaged by the cup gear; and
    an output removably coupled to the flexible laminate.

2. The flex drive system of claim 1, wherein a first engagement device comprises a plurality of set screws.

3. The flex drive system of claim 2, wherein a second engagement device comprises an adjustable mechanism engaged with the input.

4. The flex drive system of claim 3, wherein the second engagement device is an adjustment button engaged with an adjustable mechanism and capable of following a surface on an inner circumference of the cup gear.

5. The flex drive system of claim 3, wherein the second engagement device is a fixed button engaged with an adjustable mechanism and capable of engaging a surface on an inner circumference of the cup gear.

6. The flex drive system of claim 2, wherein the plurality of set screws of the first engagement device are adjustable.

7. The flex drive system of claim 1, further comprising a plurality of bearing sets.

8. The flex drive system of claim 1, wherein the cup gear further comprises a set of gear teeth.

9. The flex drive system of claim 8, wherein the set of gear teeth is distal from the flexible laminate.

10. The flex drive system of claim 1, wherein the cup gear is not flexible.

11. The flex drive system of claim 1, wherein the ring gear is not flexible.

12. The flex drive system of claim 1, wherein the movement of the input causes the cup gear to move in a cyclical manner.

13. The flex drive system of claim 1, wherein the movement of the input causes the cup gear to move in a sinusoidal manner.

14. The flex drive system of claim 1, further comprising a ball bearing set engaged by the input.

15. The flex drive system of claim 14, wherein the ball bearing set engages with the cup gear.

16. The flex drive system of claim 1, wherein the flexible laminate has a flexibility coefficient less than that of the cup gear.

17. The flex drive system of claim 1, further comprising an input side lid.

18. The flex drive system of claim 1, further comprising an output side lid.

19. The flex drive system of claim 1, wherein the ring gear is removably coupled with an input side lid and an output side lid.

* * * * *